(12) United States Patent
Washbourne et al.

(10) Patent No.: US 7,826,973 B2
(45) Date of Patent: Nov. 2, 2010

(54) OPTIMIZING SEISMIC PROCESSING AND AMPLITUDE INVERSION UTILIZING STATISTICAL COMPARISONS OF SEISMIC TO WELL CONTROL DATA

(75) Inventors: John Washbourne, Walnut Creek, CA (US); Earl Frederic Herkenhoff, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 809 days.

(21) Appl. No.: 11/763,960

(22) Filed: Jun. 15, 2007

(65) Prior Publication Data

US 2010/0027376 A1    Feb. 4, 2010

(51) Int. Cl.
    *G01V 1/40* (2006.01)
(52) U.S. Cl. .......................................................... 702/6
(58) Field of Classification Search .................... 702/6, 702/182–185, 188
    See application file for complete search history.

(56) References Cited

U.S. PATENT DOCUMENTS 5,798,982 A * 8/1998 He et al. ...................... 367/73

* cited by examiner

*Primary Examiner*—Edward Raymond
(74) *Attorney, Agent, or Firm*—Carlos L. Hanze

(57) ABSTRACT

A method for obtaining enhanced seismic data and optimized inverted reflectivities includes computing statistical well characterizations based upon band-limited well reflectivities for a subsurface region. Sets of processed seismic data are computed by applying differing processing sequences to seismic data corresponding to the subsurface region. Inverted reflectivities are computed by inverting the sets of processed seismic data. Statistical seismic characterizations are computed based upon the inverted reflectivities. Statistical difference measurements (SDMs) are computed between the statistical well and seismic characterizations. An optimal processing sequence is selected based upon the computed SDMs. Enhanced seismic data is obtained by processing the seismic data corresponding to the subsurface region. An optimal seismic inversion algorithm is obtained based upon the computed SDMs. The seismic data is inverted using the optimal seismic inversion algorithm to produce a set of optimized inverted reflectivities.

22 Claims, 25 Drawing Sheets

Overview of Optimized Processing and Inversion Flow

Factors for Determining Reflection Amplitude at An Interface interface reflectivities = $\Delta f(V_S, V_P, \rho)/g(V_S, V_P, \rho)$
$V_P$ = media compressional wave velocity
$V_S$ = media shear wave velocity
$\rho$ = media density
$\Delta V_S = V_{S2} - V_{S1}$ ; $V_S = (V_{S2} + V_{S1})/2$
$\Delta V_P = V_{P2} - V_{P1}$ ; $V_P = (V_{P2} + V_{P1})/2$
$\Delta \rho = \rho_2 - \rho_1$ ; $\rho = (\rho_2 + \rho_1)/2$ FIG. 12 – Overview of Optimized Processing and Inversion Flow FIG. 13 – Optimizing Seismic Processing Flow and Processing Parameters (Step 210)

FIG. 14 - Optimized Amplitude Inversion Flow (Step 300)

OPTIMIZING SEISMIC PROCESSING AND AMPLITUDE INVERSION UTILIZING STATISTICAL COMPARISONS OF SEISMIC TO WELL CONTROL DATA

TECHNICAL FIELD

The present invention relates generally to seismic prospecting of subterranean formations and more particularly, to using well control data to improve the quality of seismic processing and amplitude inversions.

BACKGROUND OF THE INVENTION

During the last 25 years, the oil and gas industry has sought to gain more subsurface property information from seismic data—in particular, detailed information about subsurface pore fluids, porosity, lithology, pressure and geometry. This has been accomplished, in part, by using a combination of seismic data and well log information to increase the accuracy of subsurface properties estimated from seismic data. These efforts have been rewarded by improved exploration success rates and development well "sweet spot" selection. This success is, in large part, based upon the recovery of relative acoustic impedances (product of density and compressional velocity changes at an interface).

FIG. 1 shows a number of subterranean formations 10 for which detailed subsurface information is sought. Subterranean formations 10 may include one or more reservoirs or producing zones. A seismic survey is taken over this subterranean region of interest using seismic sound sources 12 and receivers 14. The receivers 14 record sound waves which travel in wavefronts from sources 12 to the subterranean formations 10 where a portion of the sound waves are reflected back to receivers 14 and recorded as seismic traces. Often a recording vehicle 16 is used to store recorded data. Also, preferably, a wellbore 20 passes through the subterranean formations 10 and logging tools are run in the wellbore 20 to obtain subsurface property information about the elastic properties of the subsurface formations 10.

FIG. 2 is an exemplary schematic of a single shot profile including a single source 12 and multiple receivers 14 laid out in a 2D geometry. The schematic shows the ray path geometry (normal to the propagating waterfront) that primary (direct path) seismic reflection energy travels in going from a source location to reflection points 22 and then back to receiver locations. An angle $\theta_r$ is shown, which is the reflection angle for the largest source-receiver distance.

Shot profiles are the basic seismic survey components required to form a common mid-point (CMP) gathers as shown in FIG. 3. In this figure, the reflection angle $\theta_r$ is shown for the nearest source-receiver pair. A CMP trace gather is a collection of shot profile traces that have differing shot to receiver distances and a common surface or mid-point location. This location corresponds to a common subsurface reflection point 24 if geologic layers are not dipping. Because geologic layers are often complexly structured, CMP gather traces are processed using various imaging and noise suppression technologies into common reflection point (CAP) trace gathers. These gathers are the typical collection of traces that are input to amplitude inversion algorithms. The gathers contain information about how primary reflection strength or amplitude changes at a common geologic interface as a function of the ray path arrival angle. Many arrival angle traces are required to invert for the underlying interface properties that have given rise to the observed reflection amplitude.

FIG. 4 depicts a convolutional model of an amplitude versus offset (AVO) primary reflection signal and shows how a primary reflection signal amplitude of a trace can be related to interfaces 26 between geologic formations 10. Data from well logs and cores taken from wellbores 20 demonstrate that the physical properties of geologic formations typically differ from one formation to another. Sound waves propagating through these formations are most sensitive to a formation's elastic properties including compressional velocity, $v_p$, shear velocity $v_s$, and density properties $\rho$ and, to a lesser degree, their absorptive properties. Differences in elastic properties at the interface between two formations govern the amplitude of the reflected and transmitted wavefront's amplitude relative to that of the downgoing or arriving wavefront's amplitude. As FIG. 4 indicates, the magnitude of reflected signal amplitude can be approximated by a weighted sum of three elastic reflectivities or differences in interface elastic properties normalized by an average of the interface's elastic properties. The weighting function for each reflectivity is a trigonometric function of the reflection angle as described by equation (1).

$$A(\theta) \cong R_0 + G^* \sin^2 74 + R_P^* \sin^2 \theta \tan^2 \theta \qquad (1)$$

where: $A(\theta)$ amplitude reflected at angle $\theta$
 $\theta$ [averaged interface angle]=$(\theta_{refl}+\theta_{refr})/2$
 $R_0$ [p-impedance reflectivity]=$\Delta v_P/2v_P + \Delta\rho/2\rho$
 $G$ [gradient reflectivity]=$\Delta v_P/2v_P - K(\Delta\rho/2\rho + \Delta v_S/v_S)$;
 $K=(2v_S/v_P)^2$; and
 $R_P$ [p-reflectivity]=$\Delta v_P/2v_P$.

To a propagating seismic wavefront, a geologic section made up of many formation interfaces will act like a series of reflectivities spaced apart by the time it takes for the sound wave to travel between the interfaces. The primary reflection signal response is calculated by replacing each of the reflectivities by a copy of the propagating wavelet, or wavefront disturbance, scaled by the magnitude and sign of the reflectivity. The surface recorded primary response is the sum of all the time shifted, scaled wavelets, or convolution of the wavelets, with the interface reflectivity series. The two arrows at the bottom of FIG. 4 indicate that the goal of AVO amplitude inversion is to convert AVO traces into their component reflectivities while the goal of the AVO attribute analysis is to imply changes in geologic properties at the interface that have generated the inverted reflectivities.

Well log data recorded in wellbores 20 drilled into geologic formations 10 can be used to estimate the elastic and absorptive properties of the geologic formations 10 and subsequently the primary reflection signal amplitude that is part of the total recorded seismic survey response. Well log data can be used to statistically characterize the expected reflection response and to provide processing quality measures as explained below.

The groundwork for angle dependent amplitude inversion was laid in the 1950's when Bortfeld, R., 1961, *Approximations to the reflection and transmission coefficients of plane longitudinal and transverse waves:* Geophys. Prosp., v. 9, p. 485-502, described a linearized expression for the Zoeppritz reflection coefficient equation. Lindseth, R. O., 1979, *Synthetic sonic logs—a process for stratigraphic interpretation:* Geophysics, 44, p 3-26, implemented the inversion of trace amplitude for impedance. A qualitative AVO analysis was implemented shortly thereafter by Ostrander, W. J., 1984, *Plane-wave reflection coefficients for gas sands at nonnormal angles of incidence:* Geophysics 49, 1637-1648.

Subsequently, both qualitative and quantitative amplitude versus offset (AVO) inversions have been employed to estimate subsurface geologic properties. Amplitude inversion comprises the process of predicting one or more of the component reflectivities (convolved with a known wavelet) giving rise to an AVO reflection response from a collection of common subsurface reflection point traces ordered by increasing reflection angle or shot to receiver offset.

FIG. 5 shows a single interface between two media 30 and 32, a reflection angle $\theta_{refl}$ and refraction angles $\theta_{refr}$ for an arriving impulsive wavelet having unit amplitude arriving and the sum and difference elastic properties that are important in determining the strength of the reflected amplitude pulse. Also shown is that media has properties $v_{p1}$, $v_{s1}$ and $\rho_1$, and media 32 has properties $v_{p2}$, $v_{s2}$ and $\rho_2$.

Table 1 provides the factors for determining reflection amplitude at an interface.

TABLE 1

Factors for Determining Reflection Amplitude at An Interface interface reflectivities = $\Delta f(v_S, v_P, \rho)/g(v_S, v_P, \rho)$
$v_P$ = media compressional wave velocity
$v_S$ = media shear wave velocity
$\rho$ = media density
$\Delta v_S = v_{S2} - v_{S1}$; $v_S = (v_{S2} + v_{S1})/2$
$\Delta v_P = v_{P2} - v_{P1}$; $v_P = (v_{P2} + v_{P1})/2$
$\Delta \rho = \rho_2 - \rho_1$; $\rho = (\rho_2 + \rho_1)/2$ Table 2 provides definitions for reflectivities that are commonly used in AVO inversion. Note that $\Delta f(\ldots)$ and $g(\ldots)$ can be different functions of the media's differential and averaged properties.

TABLE 2

Definitions of Reflectivities Used in AVO Amplitude Inversion

| Reflectivity | Symbol | Definition |
| --- | --- | --- |
| p-impedance | $R_0$ | $\Delta v_P/2v_P + \rho\Delta/2\rho = \Delta(\rho v_P)/\rho v_P$ |
| p-velocity | $R_P$ | $\Delta v_P/2v_P$ |
| hybrid shear | $R_{SH}$ | $2(v_S/v_P)^2 (\rho\Delta/2\rho + \Delta v_S/v_S) - \Delta(\rho v_S^2)/(\rho v_P^2)$ |
| gradient | $G$ | $\Delta v_P/2 v_P - (2v_S/v_P)^2(\rho\Delta/2\rho + \Delta v_S/v_S) = R_P - 2R_{SH}$ |
| density | $R_\rho$ | $\Delta\rho/2\rho$ |
| s-impedance | $R_{SI}$ | $\Delta v_S/2 v_S + \rho\Delta/2\rho = \Delta(\rho v_S)/\rho v_S$ |
| s-velocity | $R_S$ | $\Delta v_S/2 v_S$ |

FIG. 6 is a plot of a typical AVO response for a single interface using the full Zoeppritz plane wave reflection coefficient Eqn. (1). The figure shows that for typical geologic interfaces and at small reflection angles, the reflection coefficient is nearly constant. At angles approaching 30°, the reflection coefficient typically diminishes a few percent and at angles approaching the critical angle, the reflection coefficient approaches unity. There are many approximations to the exact Zoeppritz equation. These approximations stem from the complex structure of the Zoeppritz equation and the types of angle dependent amplitude information available from the seismic data acquisition and processing methods.

The Aki-Richards equation, which is a linearized version of the plane wave Zoeppritz equation, yields an excellent approximation to primary reflection amplitude for normal to precritical incidence angles and for small contrast interfaces. It is also an equation upon which many amplitude inversion algorithms are based. In terms of the geometry shown in FIG. 5 and elastic media parameters, the equation can be written as:

$$A(\theta) \cong R_0 + G^*\sin^2\theta + R_P^*\sin^2\theta \tan^2\theta \quad (1)$$

where: $A(\theta)$=amplitude reflected at angle $\theta$
$\theta$ [averaged interface angle]=$(\theta_{refl}+\theta_{refr})/2$
$\theta$ [p-impedance reflectivity]=$\Delta V_P/2V_P + \Delta\rho/2\rho$
$G$ [gradient reflectivity]=$\Delta V_P/2V_P - K(\Delta\rho/2\rho+\Delta V_S/V_S)$;
$K=(2V_S/V_P)^2$
$R_P$ [p-reflectivity]=$\Delta V_P/2V_P$ and $V_P$, $V_S$, $\rho$, $\Delta V_P$, $\Delta V_S$ and $\Delta\rho$ are defined in Table 1.

Eqn. (1) provides that AVO amplitude, as a function of subsurface reflection angle, is a sum of products of trigonometric functions of reflection angle and three reflectivities $R_0$, $G$ and $R_P$. These reflectivities, in turn, are functions of differences and averages of compressional wave velocity, shear wave velocity and density properties across the subsurface interface. The gradient term G is a particularly complicated reflectivity involving the sum and products of three other reflectivities. In addition, the angle in Eqn. (1) is a function of the average of the incidence and refraction angles at the interface. In general Eqn. (1) can be formulated using other trigonometric angle functions and reflectivities having the form shown below:

$$\text{reflectivity} = \Delta f(V_S, V_P, \rho)/g(V_S, V_P, \rho) \quad (2)$$

The measured amplitudes can be inverted to yield the three interface reflectivities by making reflection amplitude measurements for three or more source to receiver offsets and accurately measuring the overburden velocity field from offset dependent travel times to estimate reflection angle.

TABLE 3

REFLECTIVITY MODEL $A_i = R_0 + R_1 \text{SIN}^2\phi_i + R_2 \text{SIN}^2\phi_i \text{TAN}^2\phi_i$

WHERE:

$A_i$ = MEASURED AMPLITUDE AT $\phi_i$ $R_0$ = CHANGE IN IMPEDANCE $(\Delta V_P\rho)$ $R_1$ = GRADIENT COEFFICIENT $R_2$ = CHANGE IN $V_P$ $\phi_i$ = REFLECTION ANGLE

REFLECTOR SOLUTION $$\begin{bmatrix} R_0 \\ R_1 \\ R_2 \end{bmatrix} = \begin{bmatrix} \text{ANGLE} \\ \text{GEOMETRY} \\ (3\times3) \end{bmatrix}^{-1} \begin{bmatrix} \Sigma A_i \\ \Sigma A_i \text{SIN}^2\phi_i \\ \Sigma A_i \text{SIN}^2\phi_i \text{TAN}^2\phi_i \end{bmatrix}$$

Table 3 depicts an unconstrained, least squares method (L2 norm) for amplitude inversion that is typically used to solve for reflectivities for a reflection whose amplitudes and angles have been estimated by data processing methods. The L2 unconstrained method minimizes an error function of the form:

$$E^2 = \Sigma(A_i - (R_0 + R_1^*\sin^2\theta_i + R_2^*\sin^2\theta_i \tan^2\theta_i))^2 \quad (3)$$

by solving: $\partial E^2/\partial R_0 = 0$
$\partial E^2/\partial R_1 = 0$
$\partial E^2/\partial R_2 = 0$ where: $A_i$ and $\theta_i$=event amplitudes and reflection angles.

A goal of quantitative amplitude inversion is for the signal to noise ratio of inverted attributes to be comparable over small spatial distances to that of the stack section response. As those practiced in the art of quantitative seismic amplitude inversion are well aware, it is very difficult to obtain quantitatively useful amplitude inversion results with Eqn. (1) alone. Major sources of error typically include amplitudes contaminated with various noises and inaccurate estimates of incidence angle at large reflection angles. In noisy data with a limited reflection angle range and uncorrected signal distortion effects, an unconstrained amplitude inversion will generate inverted reflectivities that have very low S/N ratios compared to the stack section or p-impedance section.

In order to improve the S/N ratio of amplitude inversion results, Eqn. (3) has been formulated using other error norms (eg. an L1 norm) and various constraints that supplement the seismic amplitude information. The constraints can be "hard" constraints—those that change the form or the variables in the reflectivity equation or "soft" constraints—additional information that is included as part of the error function which is to be minimized.

An AVO equation used in the 1970's for shorter offset acquisition geometries and non-amplitude preserving processing sequences, modeled amplitude with offset with an equation of the form:

$$A(X) \approx R_0 + G^* X^2 \qquad (4)$$

where: X=shot to receiver offset.

This formulation uses a "hard" constraint, relative to equation (1) that implies that the $\sin^2 \theta \tan^2$ term is negligible and that within a single scalar constant and at small reflection angles, squared offset is a good proxy for the $\sin^2 \theta$ term. Unmigrated CMP gathers with NMO removed were the usual input to a least squares fit of $R_0$ and G to processed amplitude. A time-averaged energy or envelope difference of the $R_0$ and the G terms was used as a direct hydrocarbon indicator and no other constraint data were employed.

Later the reflection angle was calculated from a measured velocity field using a straight ray approximation resulting in:

$$A(\theta_{st}) \approx R_0 + G^* \sin^2 \theta_{st} \qquad (5)$$

where: $\theta_{st}$=straight ray approximation to the incidence angle=$\tan^{-1}(X/(t_0 V_{rms}))$.

Eqn. (5) implies that the $\sin^2 \theta \tan^2 \theta$ term of equation (1) is negligible and that the straight ray angle is a good approximation for the subsurface reflection angle—a good assumption when there is little velocity acceleration. The use of this equation also initiated an analysis method for the detection of anomalous event behavior by crossplotting of an event's intercept against its gradient.

A form of Eqn. (1) that uses minimal hard constraint assumptions but requires amplitude information over an angle range spanning normal to critical angles and that has been used in generating the inversion examples used in this patent is:

$$A(\theta) \approx R_0 - 2R_{SH}^* \sin^2 \theta + R_P^* \tan^2 \theta \qquad (6)$$

where: $R_{SH} = \Delta(\rho V_S^2)/\rho V_P^2$

In order to compensate for inadequacies in the AVO data due to noise and distortion, assumptions regarding the relationships between a rock's compressional velocity, shear velocity and density and the form of the $V_P/V_S$ term have led to versions of Eqn. (1) that reflect these "hard" constraints by altering the variables in the reflection equation. These hard constraints include empirical relationships like $A + BV_P = V_S$ implying that:

$$\Delta V_S/V_S = (BV_P/V_S)\Delta V_P/V_P \qquad (7)$$

where A and B are constants.

The Gardner rule governing the relationship between velocity and density $$\rho = C V_P^K \qquad (8)$$

where C and K are constants has been used to imply that $$\Delta \rho/\rho = K \Delta V_P/V_P \qquad (9).$$

Other formulations of Eqn. (1) can be expressed in terms of p-impedance and shear impedance reflectivity result when the parameter $K=(2V_S/V_P)^2$ is set to a constant.

Soft constraints in the form of data weighting and damping constraints are also used in an amplitude inversion to account for noise and distortion in the seismic amplitude data. Soft constraints added to equation (3) lead to an error function of the form:

$$E^2 = \Sigma W_i (A_i - (R_0 + R_1^* \sin^2 \theta_i + R_2^* \sin^2 \theta_i \tan^2 \theta_i))^2 + W_{C0} R_0^2 + W_{C1} R_1^2 + W_{C2} R_2^2 + W_f(R_0, R_1, R_2)^2 + \qquad (10)$$

where: $W_i$=signal to noise ratios estimates of amplitudes $A_i$; $W_{C0,C1,C2,f}$=damping factors applied to reflectivities; and $f(R_0, R_1, R_2)$=damping factors for sums or differences of reflectivities.

A shortcoming associated with utilizing equation (10) is establishing criteria for choosing the weights and damping factors. Ideally damping weights should be zero and amplitude weighting factors equal to unity if the amplitude data have no noise or distortion. Because field recorded shot profiles often are more noise than signal and because the shot profile signal suffers from various distortion effects, the type of data processing described below is highly desirable prior to an amplitude inversion A typical field recorded shot profile of seismic data consists of primary reflection signals significantly distorted by the acquisition system, the effects of transmission thru the earth from shot to receiver and the influence of shot generated, ambient and acquisition noises. FIGS. 7A & 7B are actual shot profiles after normal moveout (NMO) correction (correction for the velocity of sound wave propagation) displayed with (FIG. 7A) and without (FIG. 7B) an initial noise suppression step in which primary reflections should appear as parallel flat lying coherent events. As shown by FIGS. 7A & 7B, real data primary signal reflections are difficult to detect because of various additive noises (in this case ground roll and multiples) and signal distortion effects which would yield very noisy inverted reflectivities.

FIG. 8 is a schematic depicting some of the important factors that can distort a propagating seismic wavelet and its subsurface reflection behavior. Influencing factors include the seismic source strength, the source and receiver directivity, coupling, array characteristics and near surface layering, wavefront spreading or divergence losses, inelastic absorption, interbed multiple scattering, local geologic dip, the curvature of reflecting interfaces lateral earth heterogeneity, transmission coefficient losses, the recording system filters and the subsurface reflection coefficients which are to be determined.

The purpose of seismic data processing sequence, as shown below in Table 4, is to remove multiples and other noise from the seismic data and to compensate for the effects of acquisition and earth filters on primary reflections by applying various correction algorithms to the seismic survey data. Some of the steps may themselves consist of a subsequence of steps while other steps may be repeated more than once in the sequence with different parameters as the signal and noise structure of the data becomes more evident.

TABLE 4

Processing/Inversion Sequence Components

| Generic Processing Steps | Post-migration and pre-inversion amplitude conditioning steps |
| --- | --- |
| acquisition geometry assignment | prestack imaged crp gathers |
| initial velocity analysis | CRP noise suppression * |
| data regularization | wavelet spectral equalization * |
| shot/cmp noise suppression * | residual event alignment * |
| signal corrections earth/recording | spatial amplitude balance |
| wavelet equalization/deconvolution * | offset/angle amplitude balance |
| final velocity analysis | angle/offset selection mute * |
| CMP noise suppression * | amplitude inversion/uncertainty * |
| prestack migration/velocity refinement | |

* = step may use well log statistics

An objective of an amplitude processing sequence (one that precedes an amplitude inversion) is to make various corrections to the data while also preserving the relative amplitude behavior of primary reflections in space and reflection angle or offset. This particular objective can also be quantitatively stated as that of recovering amplitudes within a single scalar constant of the earth's plane wave, band-limited subsurface reflectivity so that the response at each interface corresponds to the convolution of a wavelet having known relative amplitude, phase and timing with the local interface reflection coefficients.

An amplitude processing sequence may have 20 or more steps including those listed in Table 4. The left column of Table 4 includes typical steps in a generic processing sequence that produces migrated CRP gathers while the right column lists steps in a post-migration, pre-inversion amplitude conditioning sequence. Important generic processing steps include geometry assignment, velocity analysis, data regularization, passes of noise suppression in different domains, signal distortion corrections, a wavelet equalization correction, a final velocity analysis and a migration or imaging step.

The right hand column of Table 4 is a pre-inversion conditioning sequence that includes steps for residual noise suppression, residual event timing (velocity) corrections, wavelet spectral equalization, residual amplitude balancing and data angle/offset muting of portions of the CRP gathers. A pre-inversion conditioning sequence is important prior to amplitude inversion because generic processing sequences (left column of Table 4) often do not adequately compensate for various acquisition and earth transmission effects.

Moreover for processing steps of both columns of Table 4, a user (typically a processing geophysicist) may be required to select parameters and parameter values for each of the processing steps to implement a particular noise or signal distortion correction. The selected values may critically alter the output amplitude characteristics of the data from that step. For instance, in a deconvolution step, the choice of operator type (gapped or whitening), the degree of time variation, the size of the autocorrelation design gate, the degree of spatial averaging and the length of the deconvolution operator can significantly alter the characteristics of the deconvolved data. The combination of selected parameters and parameter values from all the processing steps will determine the quality of the final amplitude inverted reflectivities.

Ultimately, the output data from the amplitude processing sequence should be optimized for amplitude inversion. Every step and every parameter in the processing sequence could be optimized by doing a global search for steps and parameter values on the whole data set. But for a 20 step sequence with 3 parameters per step and 10 possible values per parameter, the data set would have to be processed $10^{60}$ times to search the parameter value space—a totally impractical and cost prohibitive proposition. And beyond that, even if it were possible to generate $10^{60}$ output data sets, the problem of establishing criteria for selecting the optimized data set would remain. Consequently, because of the number of steps in a sequence, the order of the steps in the sequence, the number of critical parameters in each step and the amount of computing resources required to execute individual steps, the conventional practice is to test and select parameter values on a subset of the data one step at a time. An experienced interpreter or processor then judges which parameter values generated the highest quality output data for that step or set of steps by examining various quality control (QC) displays. The degree of spatial coherence in a stack section (sum of traces in CRP gathers), the coherence in a CMP/CRP gathers or the similarity of processed output to a theoretical response derived from well control are often the chosen QC displays for parameter selection. Because amplitude inversions are very sensitive to small lateral variations in amplitude between traces in CRP gathers, because outcomes from one step impact the effect of parameter values in later steps, and because typical QC products do not use outputs from an amplitude inversion, the parameter selection judgments for a single processing step can be suboptimal relative to the sequence goal of optimizing data for al amplitude inversion.

FIG. 9 shows single CMP and CRP gathers after a variety of processing steps have been performed including those steps included in Table 4. Note the significant changes in the S/N ratio and character of the signal (flattened events) as the data went sequentially through the indicated processing steps. FIGS. 10A & 10B compare an initial NMO corrected shot profile (FIG. 10A) to a final pre-inversion CRP gather showing that the S/N ratio (FIG. 10B), amplitude distribution and phase characteristics of events have been significantly altered. FIGS. 10A & 10B dramatically indicate how significant an influence a processing sequence has on the characteristics of the primary reflected signal that will be input to an amplitude inversion.

As those experienced in the art are aware, the seismic data on the left side (FIG. 10A) would generate noisy amplitude attributes. But even the data displayed on the right side (FIG. 10B) could generate noisy inverted amplitude attributes. This is because the data processing may not have adequately compensated for various residual acquisition and earth transmission effects. In fact when left uncorrected, small variations in an event's relative timing (velocity), amplitude and phase induced by such residual effects can lead to errors of 200% to 400% in an inverted attribute's (eg. gradient) RMS level. Even when such residual effects are quite large, they may be difficult to detect with typical processing QC methods that rely on a visual assessment of event continuity in CDP or CRP domains.

Following data processing, users must select various parameters for the amplitude inversion step itself (e.g. damping parameters and data weights). The choice of inversion constraint parameters often strongly impacts those reflectivities that are derived from differences in amplitude with offset. Users typically use two methods to quality control output from an amplitude inversion: examine common depth point (CDP) spatial coherence of inverted reflectivities or analyze how closely the inverted reflectivities compare to reflectivities calculated from existing well control. Neither of these methods indicates whether the selected inversion parameters and constraints are optimal nor do these criteria ensure that the choice of parameters in a zone distant from well control is optimal. In practice, inverted attributes are often subjected to further processing, statistical analysis and "calibration" to increase their signal to noise ratio. Such post inversion analysis often cannot compensate for inadequate processing without the introduction of additional uncertainty and error.

In summary and as described above, there are several shortcomings in conventional seismic processing and amplitude inversion. A first shortcoming is that an amplitude processing and inversion sequence may be less than optimal because of poor parameter selection, resulting in suboptimal signal to noise ratio of inverted reflectivities at and away from well control. A second shortcoming is the lack of criteria for QC (quality control) in the selection of processing and inversion parameters for zones of interest that are applicable at well control as well as distant from well control.

A third shortcoming in current amplitude inversion methods is the use of various constraints to supplement the information contained in processed seismic data. Preferably, the relative amplitude behavior of optimally processed CRP gathers is proportional to the angle dependent interface reflection coefficient and therefore requires minimal hard or soft constraint information in order to yield high signal to noise ratio (S/N) inverted attributes. When processed seismic data is of poor quality, the inversion algorithm itself may have to be strongly constrained (via damping and weighting parameters) to produce realistic values of inverted attributes. As constraint weights increase, the inverted attributes become more dependent on the constraints and less dependent on the processed seismic data. This brings into question the accuracy of inversion results away from locations where the constraints may not apply.

The present invention addresses these shortcomings.

SUMMARY OF THE INVENTION

Referring, to FIG. 21, one aspect of the invention includes a method for obtaining enhanced seismic data and optimized inverted reflectivities. The method includes the step of computing a plurality of statistical well characterizations (SCs$_{well}$) based upon band-limited well reflectivities corresponding to a subsurface region of interest. A plurality of sets of processed seismic data are computed by applying a plurality of differing seismic processing sequences to at least a portion of a collection of seismic data corresponding to the subsurface region of interest. A plurality of sets of inverted reflectivities are also computed by inverting the plurality of sets of processed seismic data. A plurality of statistical seismic characterizations (SCs$_{seismic}$) are computed based upon the plurality of sets of inverted reflectivities. A plurality of statistical difference measurements (SDMs) are computed between the SCs$_{well}$ and the plurality of SCs$_{seismic}$. An optimal seismic processing sequence is selected based upon the computed SDMs. Enhanced seismic data is obtained by processing the seismic data corresponding to the subsurface region of interest utilizing the optimal seismic processing sequence. An optimal seismic inversion algorithm is then selected based upon the computed SDMs. Then the seismic data is inverted using the optimal seismic inversion algorithm to producing a set of optimized inverted reflectivities by inverting the enhanced seismic data using the optimal seismic inversion algorithm.

In the method, the differing seismic processing sequences can include parameters, and at least the values of the parameters differ between the differing processing sequences. In the method, the differing seismic processing sequences can differ at least by differing an order of processing steps within each respective seismic processing sequence. In the method, the differing seismic processing sequences can also differ at least by differing a number of processing steps within each respective seismic processing sequence.

In the method, the statistical difference measurements (SDMs) can be utilized in an optimization scheme to predict the optimal seismic processing sequence. In the method, the band-limited well reflectivities can be computed without using well log data obtained from logging a wellbore in the region of interest.

In the method, the step of computing a plurality of statistical well characterizations (SCs$_{well}$) can include the steps: (i) acquiring, well log data; (ii) selecting, well log processing algorithms with well log processing parameters; and (iii) transforming the well log data into band-limited well reflectivities using the well log processing algorithms. The well log data can be acquired from one of a wellbore in the region of interest, an analogue geologic setting, am average of a number of analogue wells, and a statistical model.

In the method, the step of selecting the optimal seismic processing sequence can also include the step of determining whether any of the SDMs are within a predetermined criteria.

In the method the SCs$_{well}$ can be computed based upon RMS levels of shear, compressional and density reflectivities and correlation coefficients among shear compressional and density reflectivities. In the method, the SDM is responsive to the ratio of S/(S+N) of well reflectivities to the S/(S+N) of seismic data reflectivities. The statistical well characteristics can also be used in a Zoeppritz reflectivity equation to compute the expected RMS of seismic traces in an AVO gather.

In the method, the SDM can be inversely proportional to the difference between the expected S/(S+N) ratio of well reflectivities and the S/(S+N) ratio of seismic data reflectivities.

Referring to FIG. 22, yet another aspect of the invention is a method for obtaining enhanced seismic data that might be used for optimized inverted reflectivites or other purposes. The method includes the step of computing a set of statistical well characterizations (SCs$_{well}$) based upon band-limited well reflectivities corresponding to a subsurface region of interest. A plurality of sets of processed seismic data are computed by applying a plurality of differing seismic processing sequences to at least a portion of a collection of seismic data corresponding to the subsurface region of interest A plurality of sets of inverted reflectivities are computed by inverting the sets of processed seismic data utilizing seismic inversion algorithms with fixed sets of parameters. A set of statistical seismic characterizations (SCs$_{seismic}$) is computed based upon the set of inverted reflectivities. A statistical difference measurement (SDM) is computed between the set of SCs$_{well}$ and the set of SCs$_{seismic}$. An optimal seismic processing sequence is selected based upon the computed SDMs. The seismic data is processed using the optimal seismic processing sequence and parameters to produce a set of enhanced seismic data.

The method call also include the steps of determining whether the SDM is within a predetermined criteria, and repeating the computational and selection steps utilizing the fixed sets of parameters of the seismic processing sequence until the SDM is within a predetermine ed criteria. The method can also include the step of obtaining enhanced seismic data by processing the seismic data corresponding to the subsurface of interest utilizing the seismic processing sequence associated with the SDM that is within the predetermine criteria. The seismic processing sequences can include parameters, and at least the values of the parameters can differ between the differing processing sequences. The seismic processing sequences can differ at least by differing an order of processing steps within each respective seismic processing sequence. The seismic processing sequences can differ at least by differing a number of processing steps within each respective seismic processing sequence.

It is an object of the present invention to provide a method in which the data processing steps including the order, parameters and parameter values are optimized so that minimal additional constraint information is required to obtain statistically relevant results from an amplitude inversion.

It is another object to provide a method for estimating statistical measures of amplitude processing and amplitude inversion quality.

Referring to FIG. 23, another aspect of the invention includes a method for obtaining optimized inverted reflectivities. The method includes the step of obtaining band-limited well reflectivities corresponding to a subsurface region of interest. A plurality of statistical well characterizations (SCs$_{well}$) are computed based upon the well reflectivities. Processed seismic data corresponding to the subsurface region of interest is obtained. A plurality of sets of inverted reflectivites are computed by inverting the set of processed seismic data utilizing a plurality of differing seismic inversion algorithms. A plurality of statistical seismic characterizations (SCs$_{seismic}$) are computed based upon the plurality of sets of inverted reflectivities. A plurality of statistical difference measurements (SDMs) are computed between the SCs$_{well}$ and the statistical seismic characterizations SCs$_{seismic}$. An optimal seismic inversion algorithm is selected based upon the computed SDMs. The seismic data is inverted using the optimal seismic inversion algorithm to produce a set of optimized inverted reflectivities.

In the method, the differing inversion algorithms can have parameters which have differing values. The method can also include the step of calculating uncertainty values for the inverted reflectivities.

BRIEF DESCRIPTION OF THE DRAWINGS

These and other objects, features and advantages of the present invention will become better understood with regard to the following description, pending claims and accompanying drawings where:

FIGS. 19A-1&2 and 19B-1&2 compare gradient sections and RMS levels resulting from unconstrained and optimally constrained (damped) amplitude inversions;

DETAILED DESCRIPTION OF THE INVENTION

Figure 1:
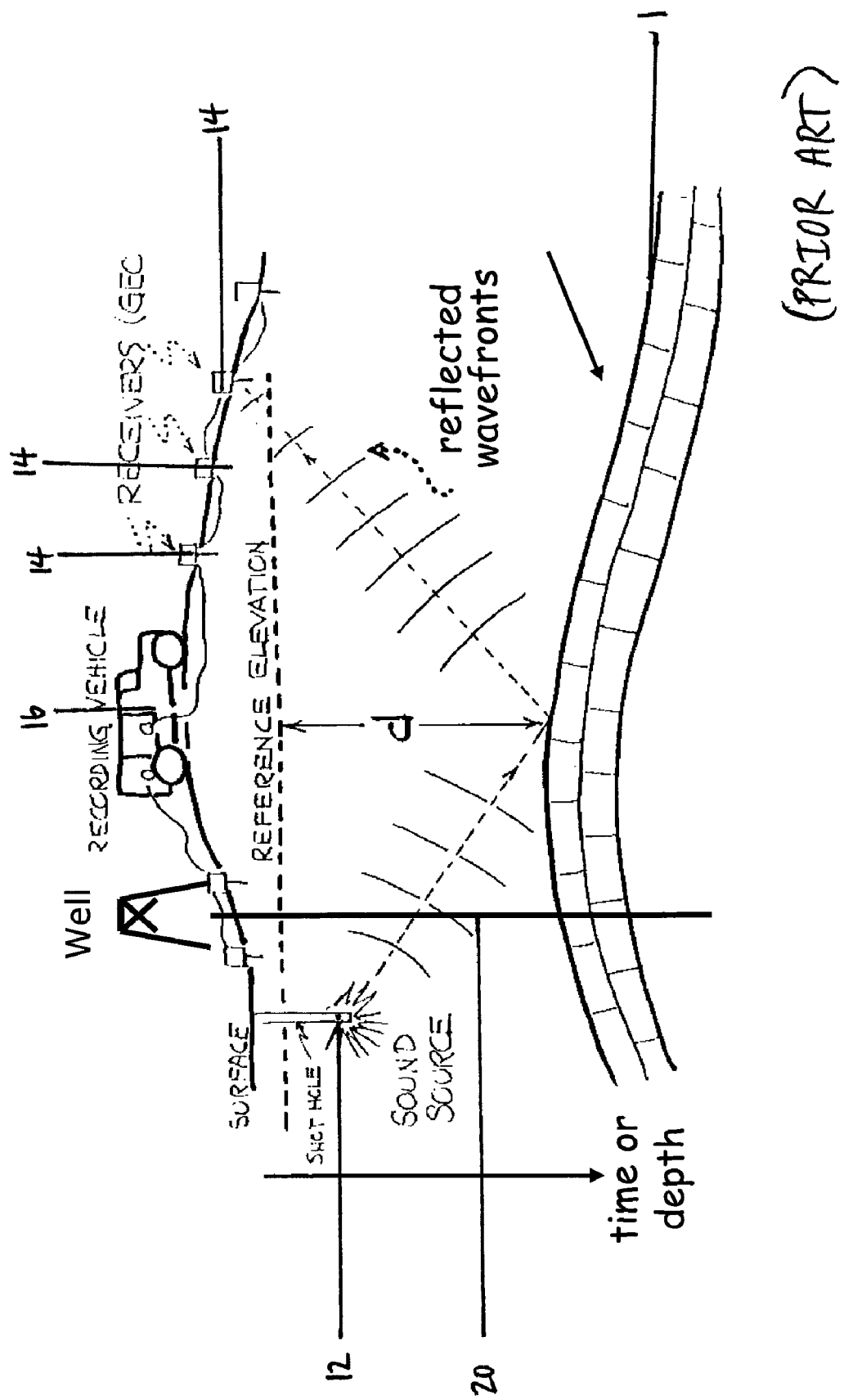
FIG. 1 shows a schematic cutaway view of subterranean formations for which seismic information is sought.
Figure 2:
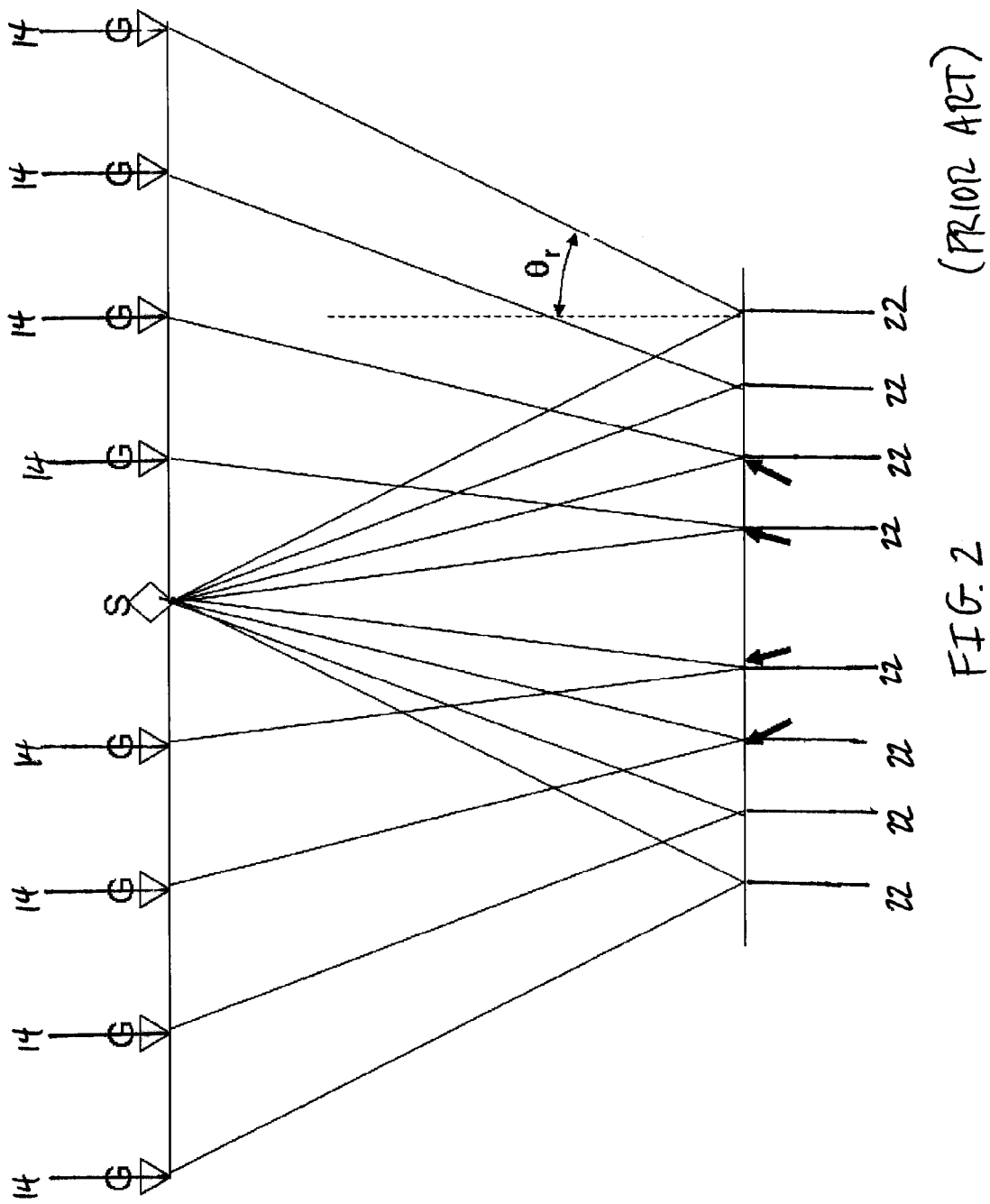
FIG. 2 is a shot profile gather of traces showing the mid points and reflection angles for each trace.
Figure 3:
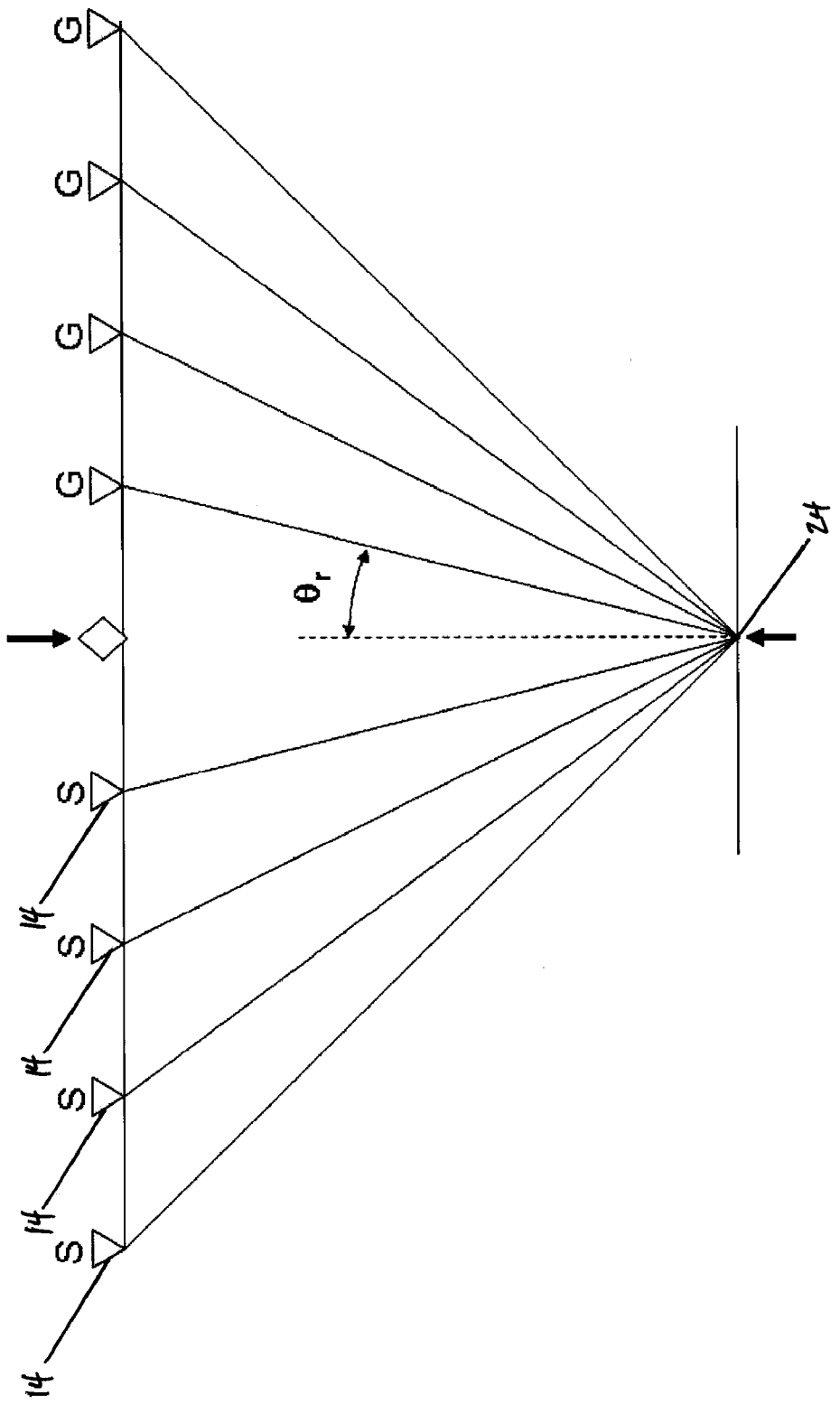
FIG. 3 is a common midpoint point (CMP) gather showing the relationship between midpoints and reflection points.
Figure 4:
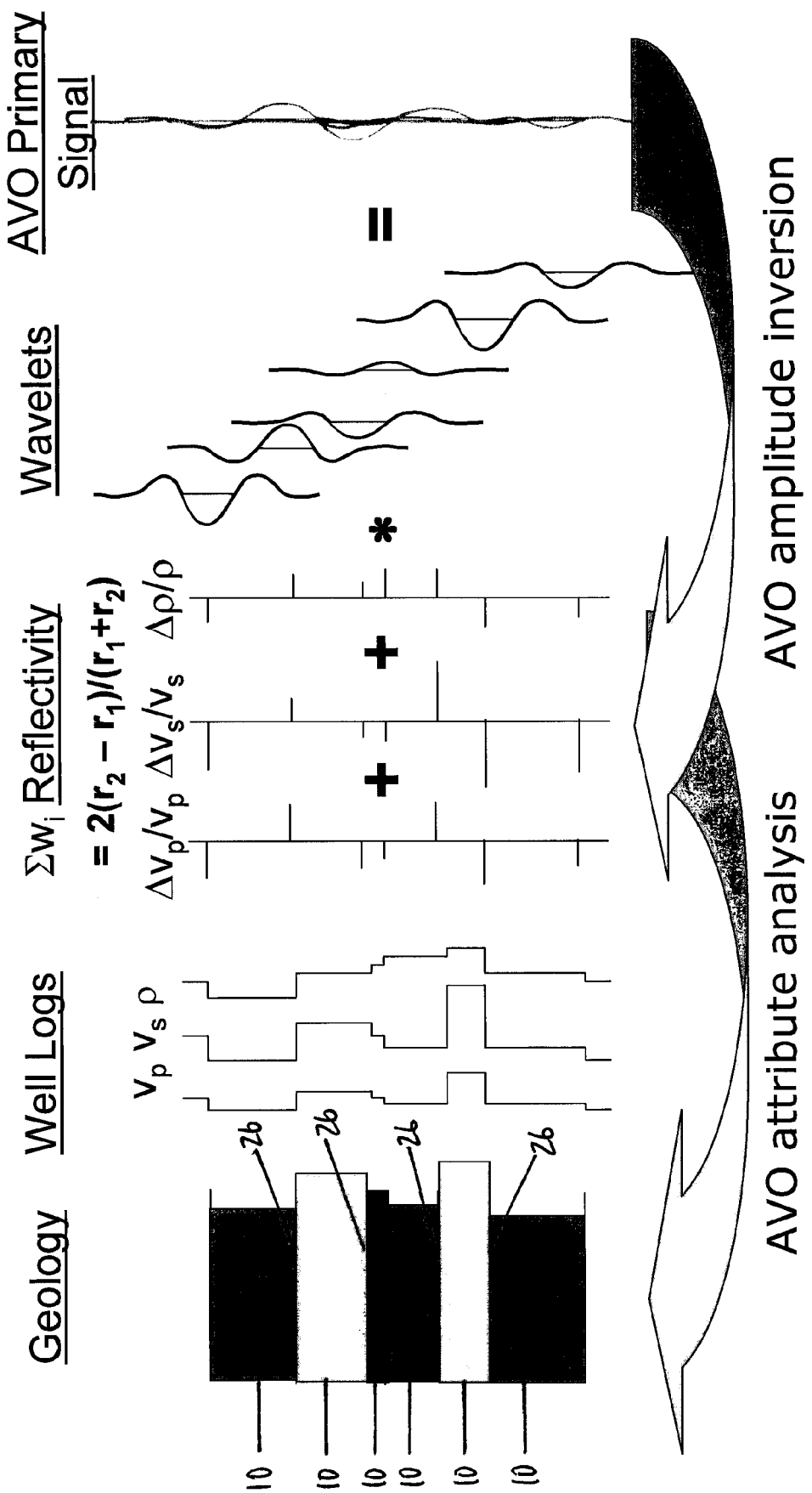
FIG. 4 shows a convolutional model of amplitude versus offset (AVO) seismic data indicating the objectives of amplitude inversion and amplitude analysis.
Figure 5:
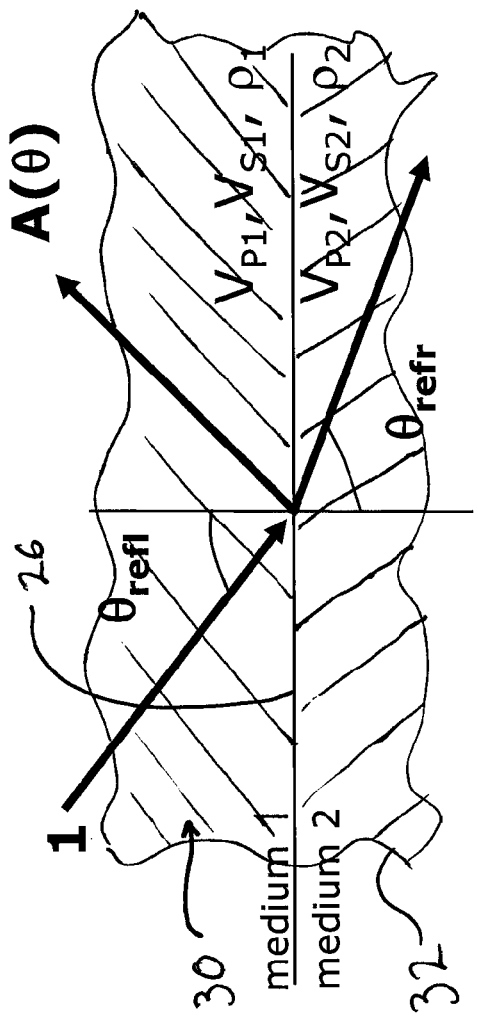
FIG. 5 is a schematic showing the factors that determine reflection amplitude.
Figure 6:
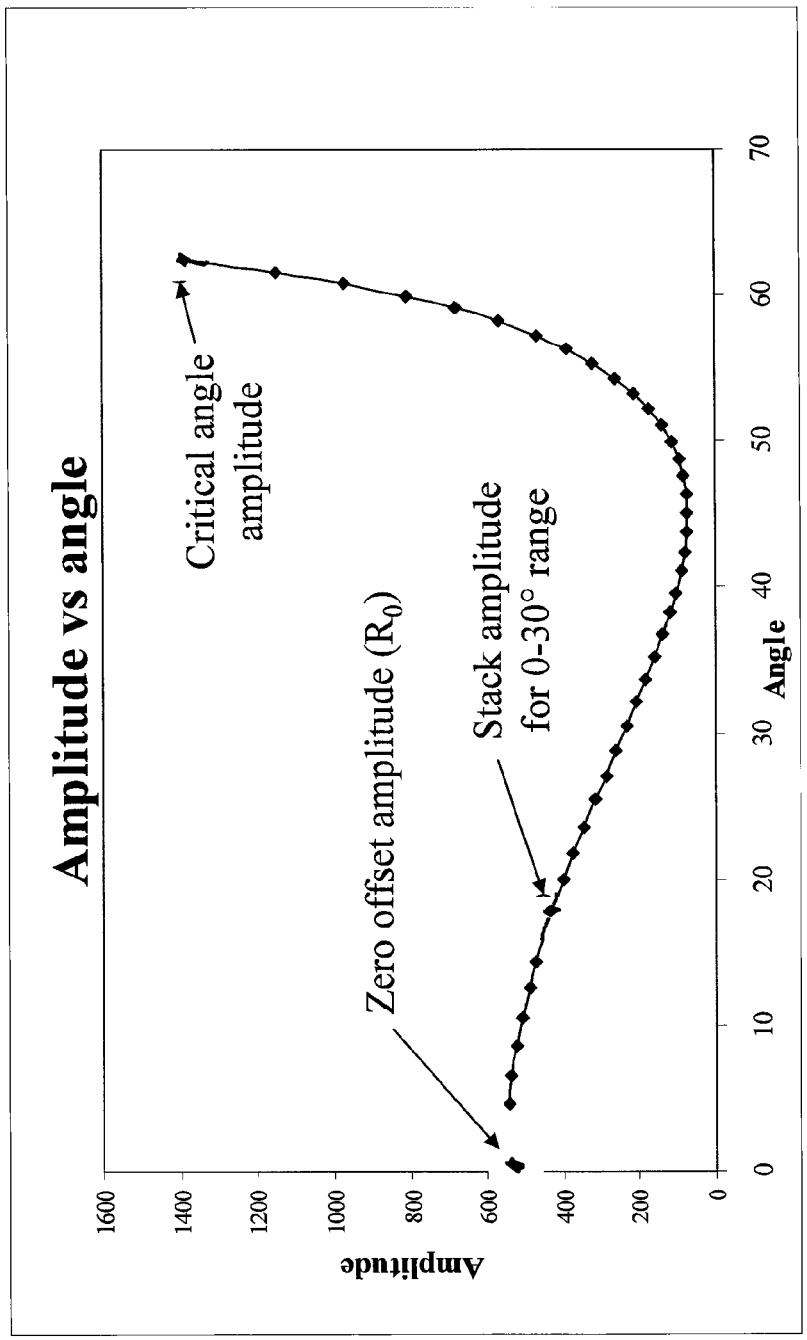
FIG. 6 shows typical variations of reflected amplitude from normal to critical incidence angle.
Figure 7:
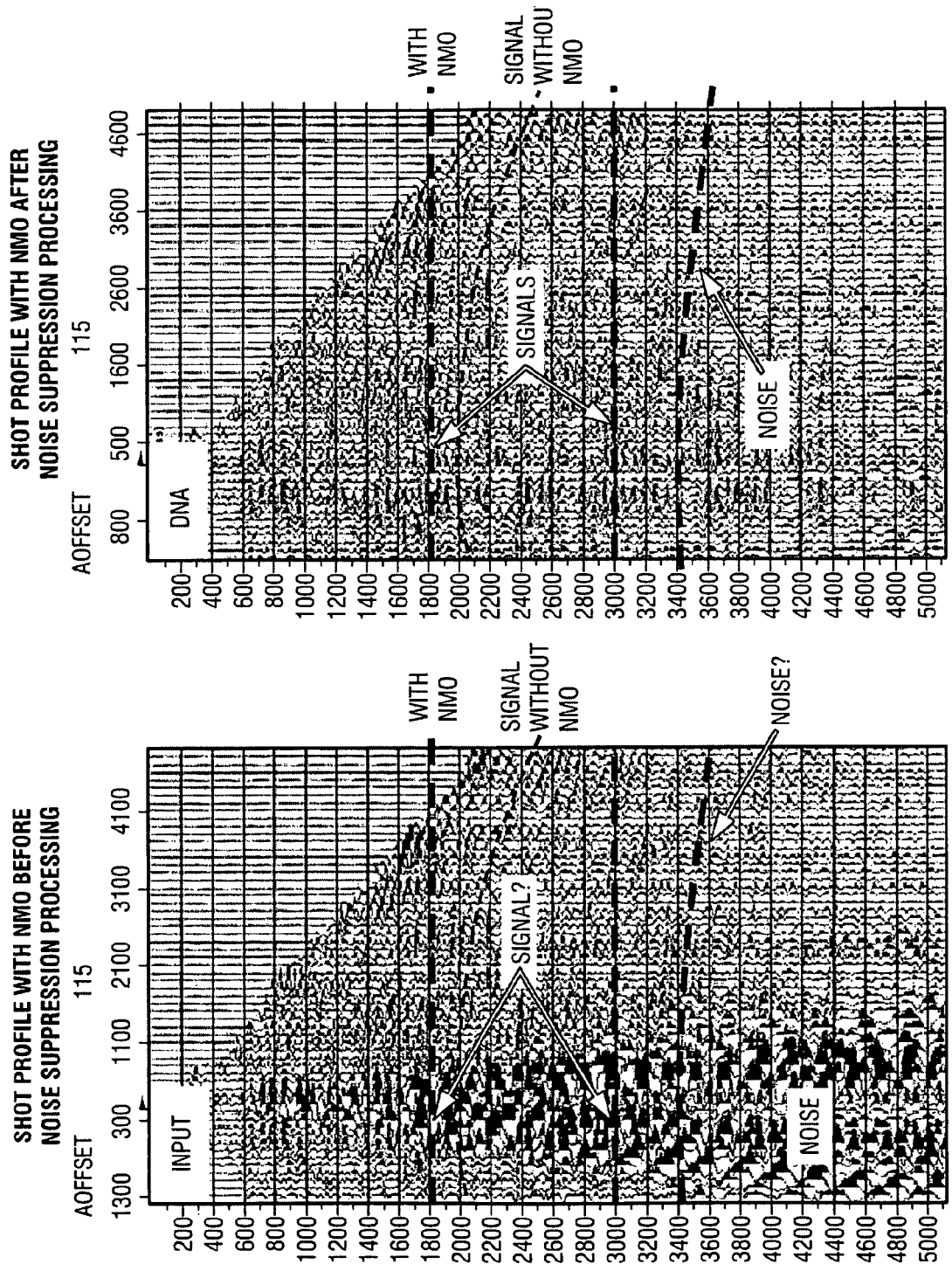
FIGS. 7A & 7B show shot profiles with normal moveout (NMO) applied before (FIG. 7A) and after (FIG. 7B) a noise suppression processing step.
Figure 8:
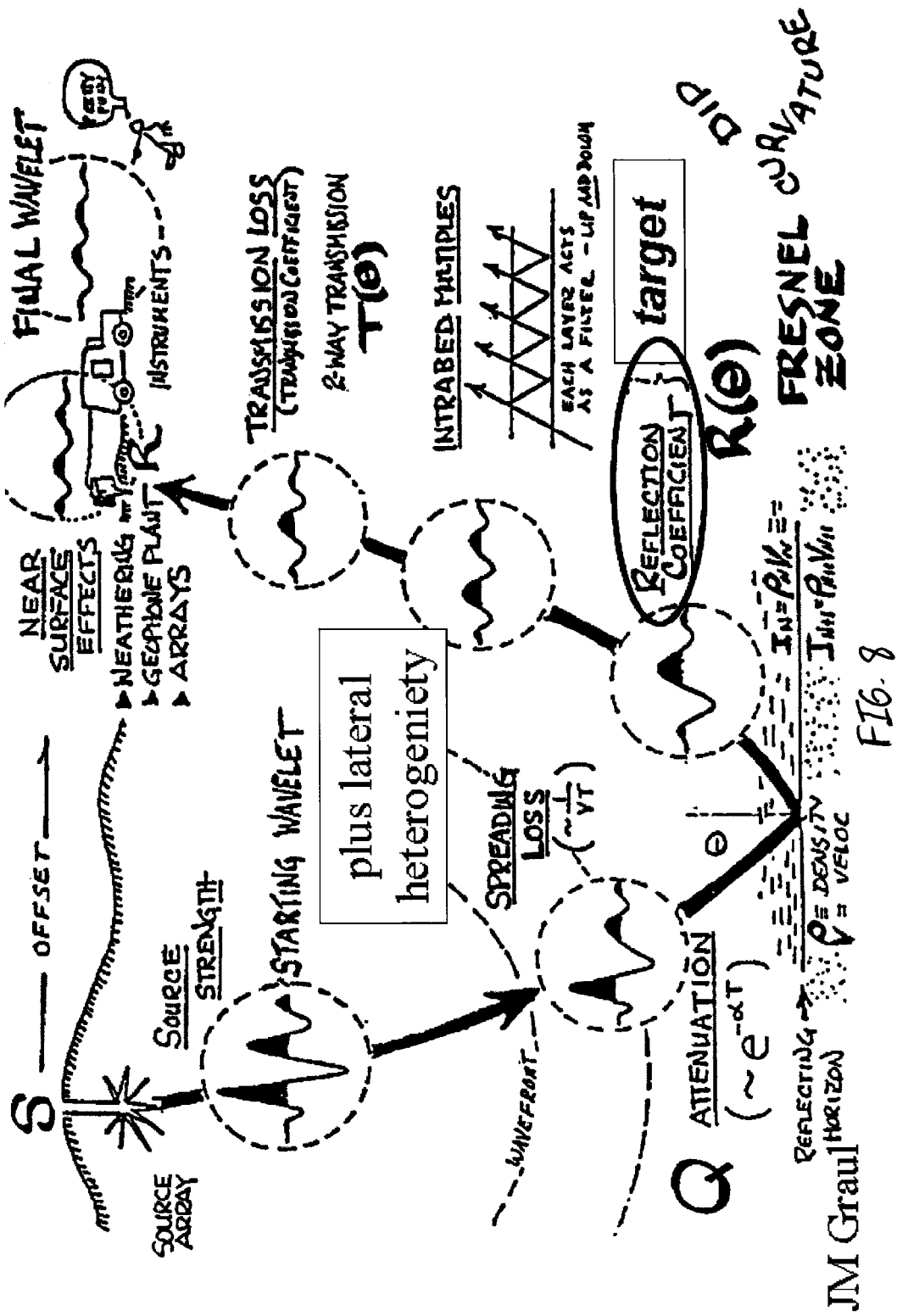
FIG. 8 is a schematic showing various factors that influence the amplitude of a seismic wavelet.
Figure 9:
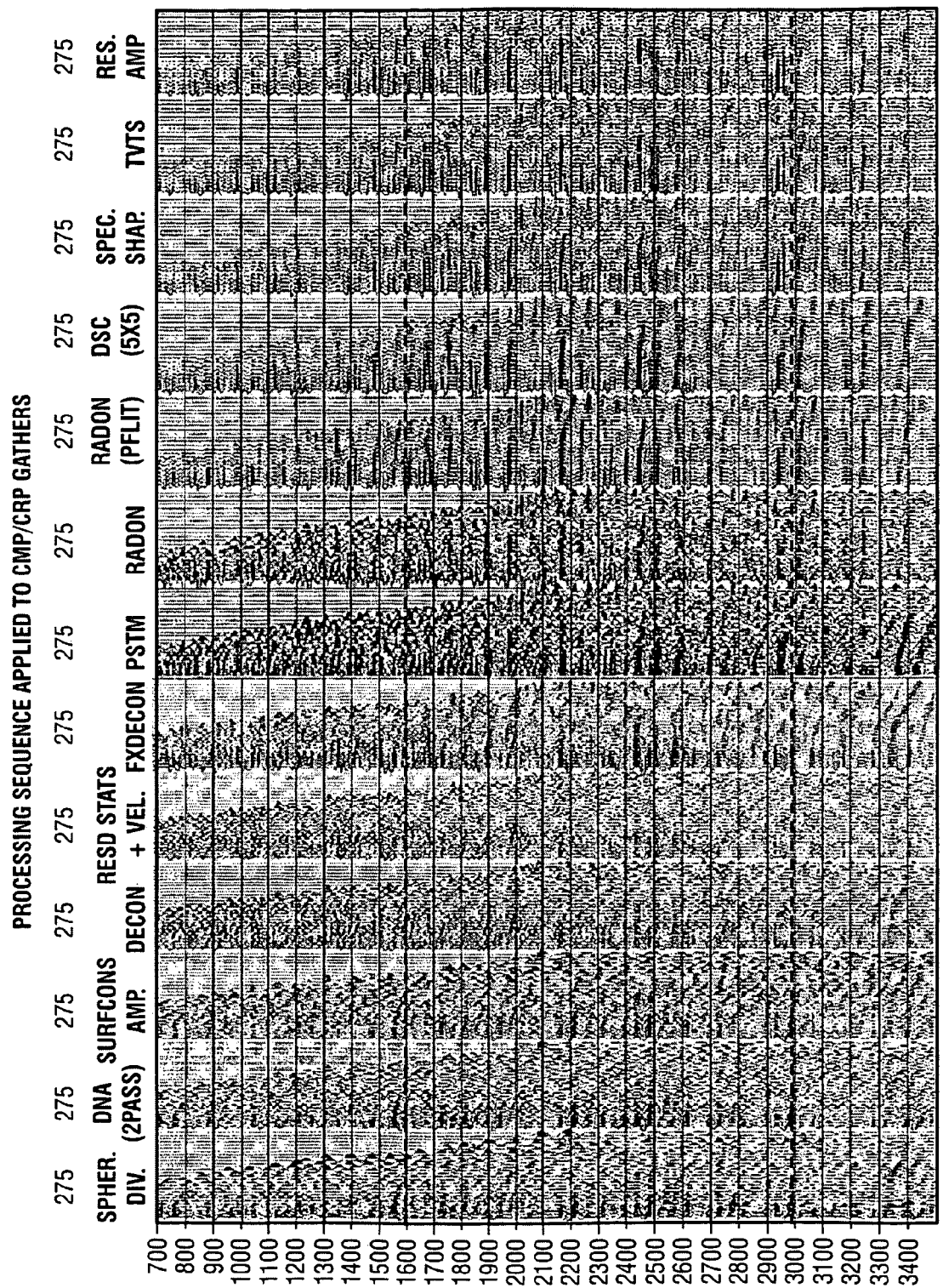
FIG. 9 shows the effect of various steps of a processing sequence on a gather of seismic traces.
Figure 10B:
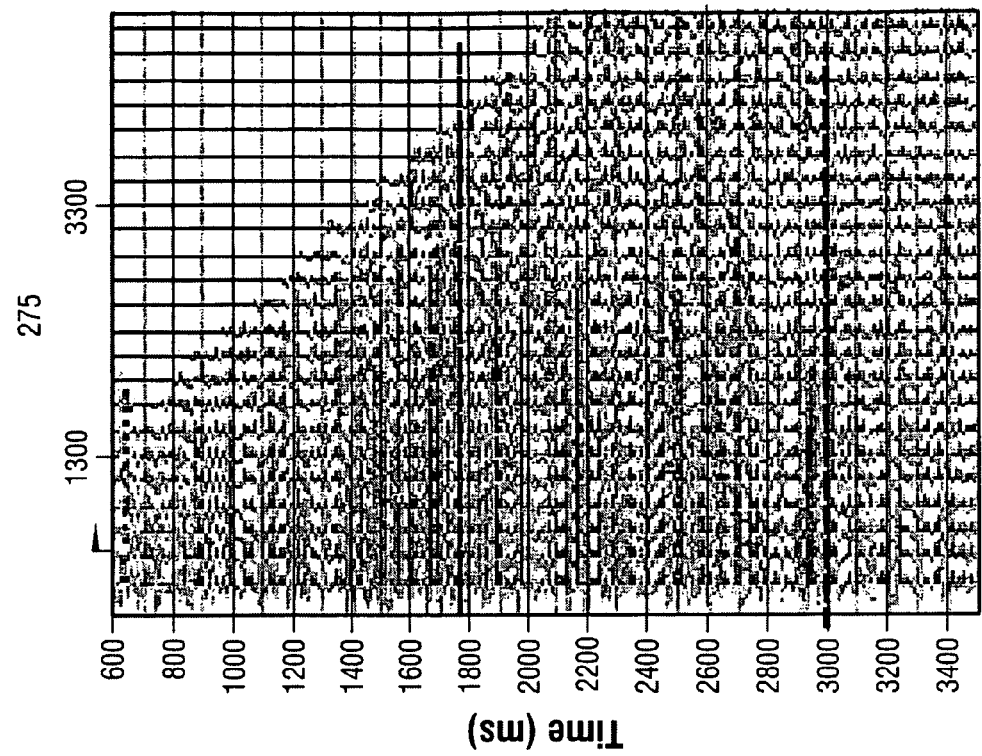
FIGS. 10A & 10B show an input shot profile containing noise and signal distortion (FIG. 10A) and the output processed, post-imaging conditioned data (FIG. 10B) that is input to an amplitude inversion.
Figure 10A:
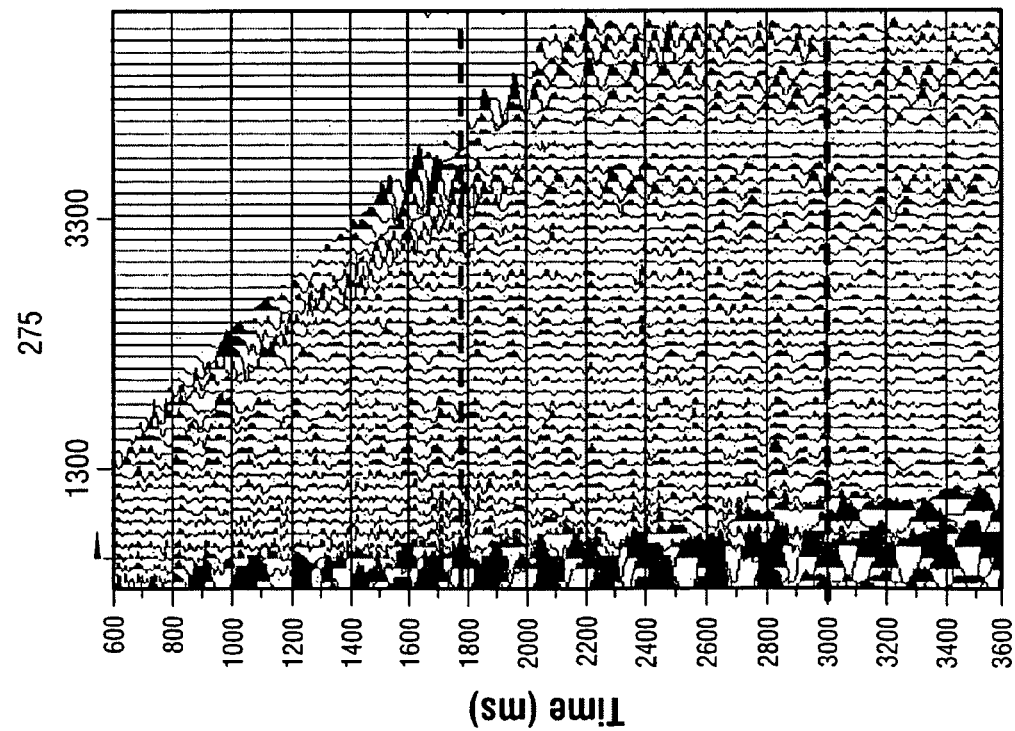
Figure 11:
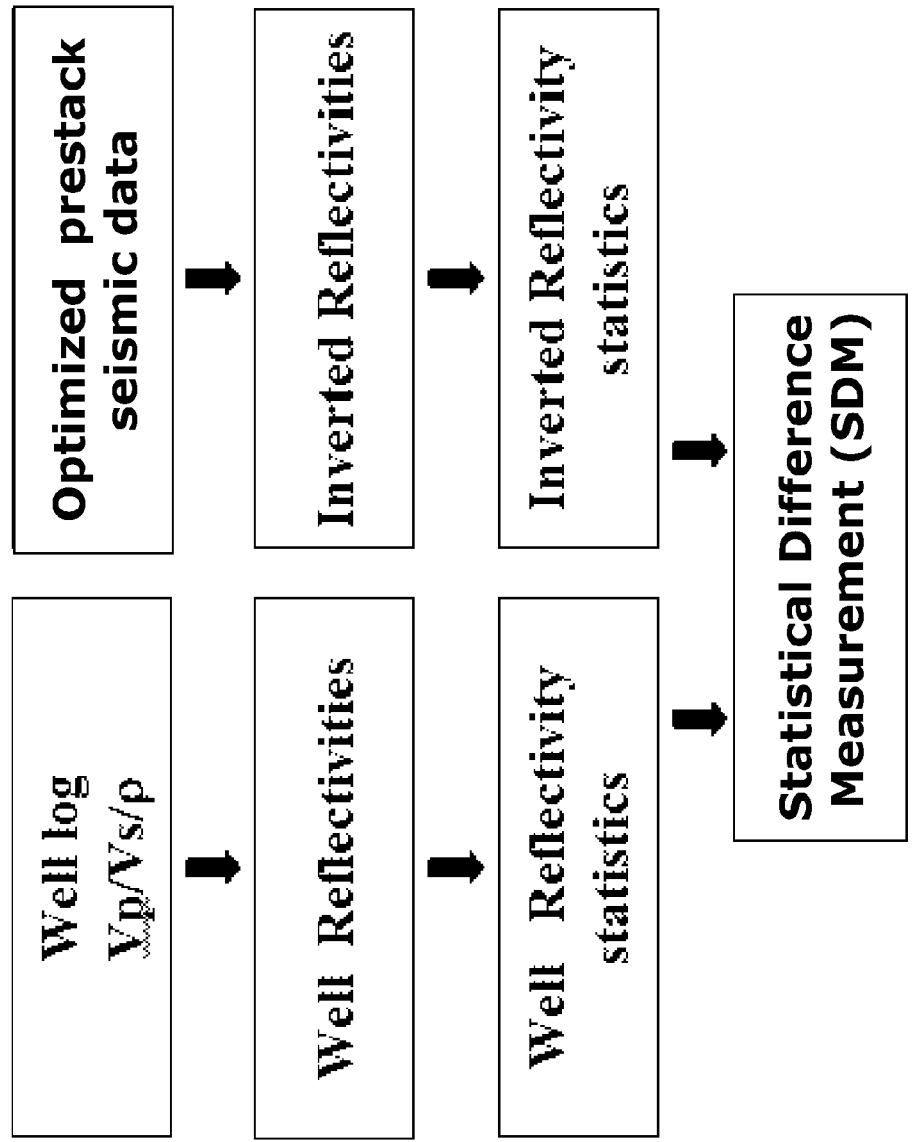
FIG. 11 is an overview of an embodiment for determining statistical difference measurements derived from well log and seismic data.

This invention overcomes many of the shortcomings described in the background. A generalized overview of the invention is shown in FIG. 11. A difference between statistics measured from well control and from inverted seismic data is minimized by a method of selecting well log processing, seismic processing and inversion parameters. This invention is implemented by employing trial inversions of the seismic data over probable ranges of parameters in multiple processing steps. Statistical characterizations (SCs) employing functions of correlation coefficients and root means square (RMS) levels or alternately cross-correlations and autocorrelations among the inverted set of reflectivities are used to measure a "goodness" or statistical distance measurement (SDM) for selected parameters (SDM is a measure of the difference in the statistical characterization of inverted seismic data and well data). Those parameters that result in inverted reflectivities having statistical characterizations that best match well control statistical characterizations are selected therein optimizing parameter selection in amplitude processing and inversion sequence.

Figure 12:
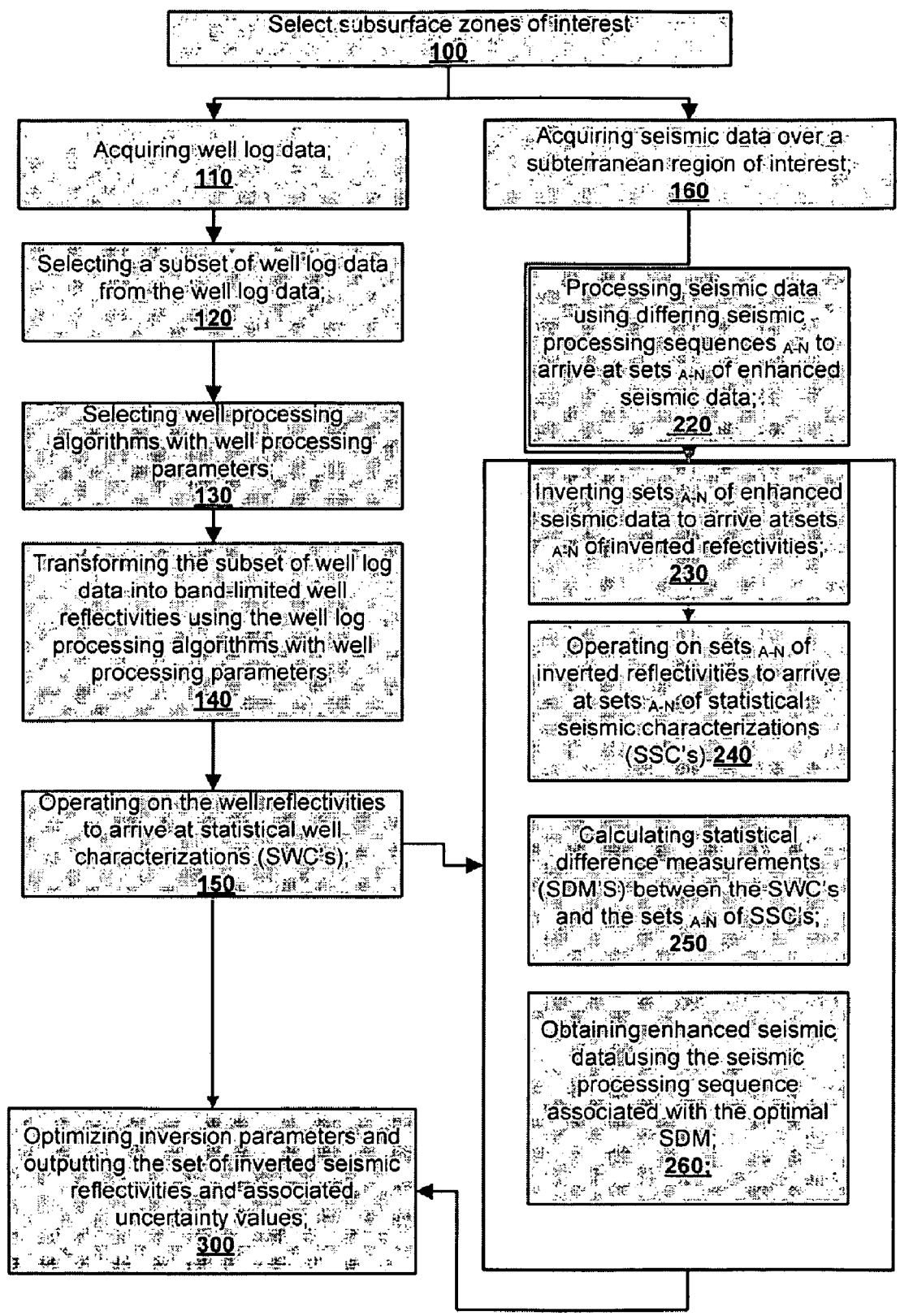
FIG. 12 is a flowchart describing steps taken, in an embodiment of the present invention, to produce an optimized set of seismic reflectivities and statistical difference measurements (SDMs) from the well log data and seismic data.

FIG. 12 is an overview flowchart of an embodiment of steps which may be taken to obtain an optimized set of inverted seismic reflectivities. In step 100, subsurface zones of interest from well control and/or seismic data are selected. Well log data that can be used to estimate subsurface compressional wave, shear wave, and density properties is acquired in step 110. Next, a subset of well log data from the zone of exploration or development interest is selected from the well log data in step 120. One or more well log processing algorithms comprising a well log processing sequence, each having associated processing parameters, are selected in step 130. The subset of well log data is transformed in step 140 into band-limited well reflectivities using the well log processing sequence. The well reflectivities are then operated on in step 150 to arrive at a statistical well characterization ($SC_{well}$) of the well reflectivities. The $SCs_{seismic}$ typically include ratios of zero lag autocorrelations and cross-correlations and/or correlation coefficients and RMS levels between different reflectivities over an interval encompassing the time/depth zone and area of interest defined in step 100.

$SCs_{well}$ will include various functions of the following reflectivities that call be output from AVO amplitude inversion algorithms:

| Reflectivity | Symbol | Definition |
|---|---|---|
| p-impedance | $R_0$ | $\Delta V_P/2V_P + \Delta\rho/2\rho = \Delta(\rho V_P)/\rho V_P$ |
| p-velocity | $R_P$ | $\Delta V_P/2V_P$ |
| hybrid shear | $R_{SH}$ | $2(V_S/V_P)^2 (\Delta\rho/2\rho + \Delta V_S/V_S) = \Delta(\rho V_S^2)/(\rho V_P^2)$ |
| gradient | $G$ | $\Delta V_P/2V_P - (2V_S/V_P)^2(\Delta\rho/2\rho + \Delta V_S/V_S) = R_P - 2R_{SH}$ |
| density | $R\rho$ | $\Delta\rho/2\rho$ |
| s-impedance | $R_{SI}$ | $\Delta V_S/2V_S + \Delta\rho/2\rho = \Delta(\rho V_S)/\rho V_S$ |
| s-velocity | $R_S$ | $\Delta V_S/2V_S$ |

Seismic data generated from the subterranean region of interest is collected in step 160. In step 200 of FIG. 12, the seismic data is processed into enhanced seismic data using a number of seismic processing steps 210. The goal of each step 210 is to select processing steps, parameters and parameter values that will optimize the enhanced seismic data for the final amplitude inversion.

Step 300 consists of the steps 310-360 for optimizing amplitude inversion parameters and inverting the enhanced seismic data for outputting an optimized set of seismic reflectivities and associated uncertainty values.

Figure 13:
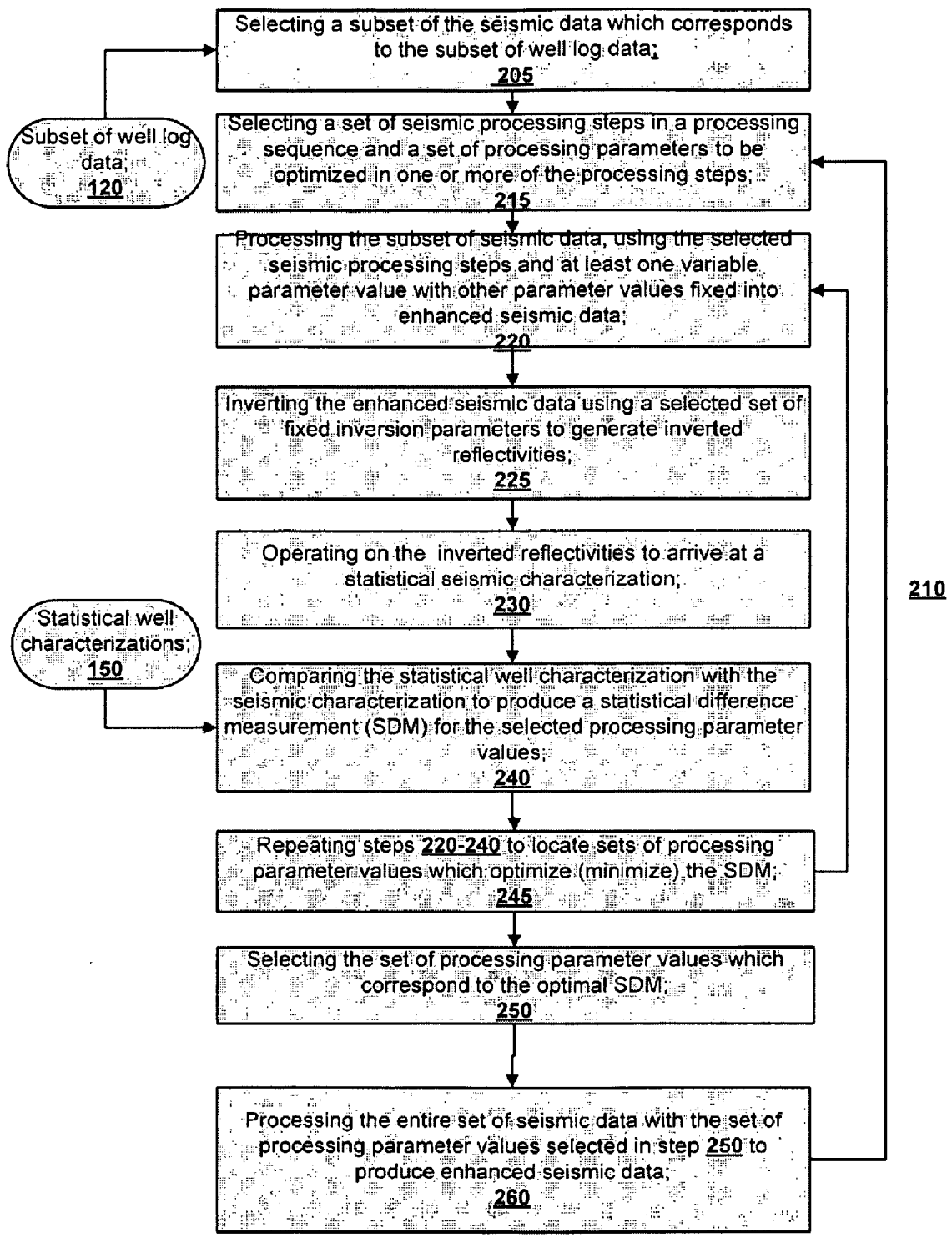
FIG. 13 is a flowchart of an embodiment showing steps taken to produce enhanced seismic data from an optimized seismic processing flow which utilizes optimized statistical difference measurements (SDMs)

Referring now to FIG. 13, steps 200 and 210 are illustrated in more detail. A subset of the seismic data is selected in step 205 which can correspond to the subset of well log data of step 120. In step 215, a set of processing steps like those shown in FIG. 12 are selected to process the seismic data selected in step 205. Each of the processing steps may have one or more processing parameters. In many cases step 215 may be used to optimize which processing steps and/or the order of the processing steps in the processing sequence as well as the processing parameter values. Some of the processing parameters will have fixed values while others may have variable values which are to be optimized.

The seismic data selected in step 205 is then processed in step 220 using a first set of trial steps from 215 and parameters values in the processing sequence to produce enhanced seismic data. This set of enhanced seismic data is inverted in step 225, using a selected set of fixed inversion parameters to produce a corresponding set of seismic reflectivities. This set of inverted seismic reflectivities is operated on in step 230 to arrive at a statistical seismic characterization ($SC_{seismic}$) of the same form as that determined in step 150 from the well log data.

A statistical difference measurement (SDM) is calculated in step 240 using differences or ratios of statistical characterizations (SCs) with an equation of the form:

$$SDM = \Sigma(SC_{well,i} - SC_{seismic,i})^2/N$$

$$\text{or } SDM = \Sigma(SC_{well,i}/SC_{seismic,i} - 1)^2/N \quad (8)$$

where:
N = number of CRP's in seismic data subset;
$SC_{well,i}$ = statistical well characterization at the $i^{th}$ CRP;
$SC_{seismic,i}$ = statistical seismic characterization at the $i^{th}$ CRP.

In step 245, various strategies are employed to select new trial parameter values that will efficiently locate the minima on the SDM surface. If the expected SDM surface is simple, a systematic evaluation of the SDM for a grid of parameter values and repeating of steps 220-240 may efficiently locate the optimum (i.e. minimum) SDM. Alternately, numerical and/or analytical derivatives computed in a region around the initial trial parameter value can be used to create a local model of the SDM surface. This model is then used to select a new trial set of parameter values close to the minimum of the modeled SDM surface.

In step 250, the set of processing parameter values which correspond to the optimal SDM is selected. Preferably, an optional step 248 of interpolating between SDMs may be used to further refine a set of optimized parameter values.

In step 260, the entire set of seismic data is processed with the set of processing parameter values selected in step 250 to produce enhanced seismic data as the output of a single processing step 210.

Step 210 is repeated for each selected set of processing; steps to produce enhanced seismic data as the overall output of step 200 and as input to a final amplitude inversion. As depicted by FIG. 12, the seismic data may be processed thru several different seismic processing steps, some of which may use the general SDM method of step 210 and FIG. 13 and others of which may not require an SDM methodology to optimize the parameter values for inversion. Typically, initial processing steps may be non-SDM while SDM steps may be important for post-imaging steps listed on the right side of Table 4 herein. In general steps 210 serve to overcome the shortcoming of previous processing parameter selection by making the enhanced seismic data more inversion ready. This reduces the requirement for large damping weights and other constraints in the final amplitude inversion steps of FIG. 14.

Figure 14:
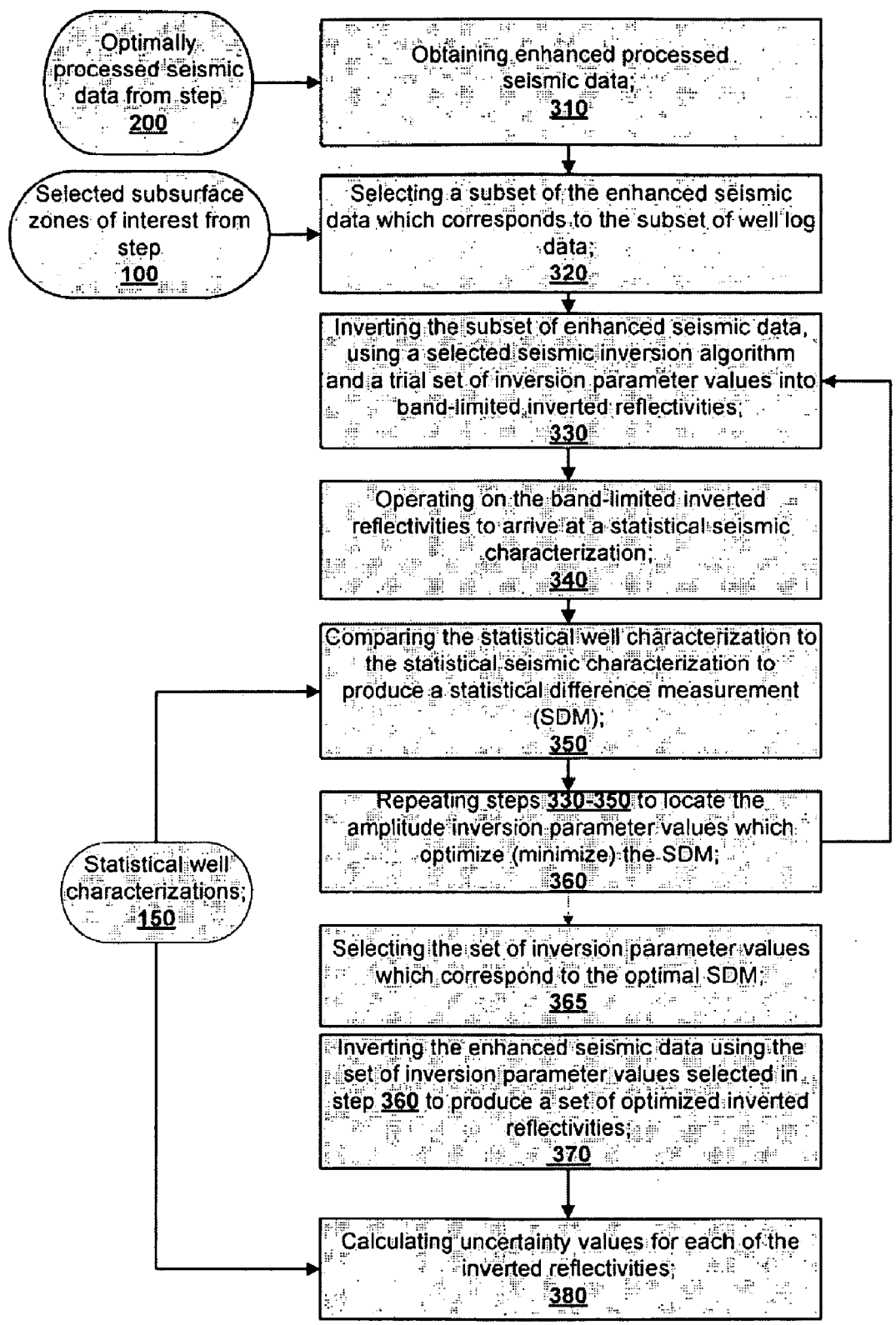
FIG. 14 is a flowchart showing steps for the processing of enhanced processed seismic data into a set of seismic reflectivities and associated uncertainty values which utilizes statistical difference measurements (SDMs)

Referring to FIG. 14 which describes step 300 the final output of enhanced seismic data from step 200 is inverted for reflectivities using the optimized amplitude inversion flow of steps 310-380. The data from step 200 is obtained in step 310 and a subset of the enhanced seismic data is selected in step 320 from the enhanced processed seismic data of step 200. This selected subset of seismic data preferably corresponds to the subset of well log data selected in step 150. In a first preferred manner, this selection of the subset of seismic data includes all the seismic traces that correspond to the same depth interval as the well log data. Alternatively, the selection of the seismic data may be a decimated subset of the whole seismic data survey.

This subset of the enhanced seismic data from 320 is inverted into band-limited reflectivities in step 330 using a selected seismic inversion algorithm and a trial set of inversion parameter values. As discussed herein the amplitude inversion algorithm can be one of several formulations.

The inverted reflectivities are operated on in step 340 to arrive at a statistical seismic characterization ($SC_{seismic}$) of the same analytic form as the statistical well characterization ($SC_{well}$) of step 150. In step 350, a statistical well characterization ($SC_{well}$) of step 150 is projected to a seismic CRP gather location and compared to the statistical seismic characterization ($SC_{seismic}$) of step 340 to produce a statistical difference measurement (SDM) for the trial amplitude inversion parameter values using one of the forms of equation (8) above.

For step 360, steps 330-350 are repeated with trial inversion parameter values that serve to locate the optimal (minimal) SDM. A preferred method uses a subset of CRPs to sample the inversion parameter space with a grid of inversion parameter values, computes the SDMs on the grid and then selects the inversion parameters that correspond to the minimum SDM in step 365.

In step 370, the entire enhanced seismic data is inverted to produce a set of optimized inverted reflectivities using the set of inversion parameter values associated with the optimized SDM of step 365.

Uncertainty values, which are inversely proportional to the S/(S+N) [signal/(signal+noise)] ratio of the inverted reflectivities, are calculated in step 380 for each of the inverted reflectivities.

The set of optimized inverted reflectivities and associated uncertainties are output in step 390 for use in other amplitude analysis procedures. For example, an event's intercept and gradient attributes can be cross-plotted against one another to detect potential regions of significantly increased hydrocarbon saturation levels.

Referring again to FIG. 12, each of the above steps will be described in greater detail. Subsurface or geologic zones of interest are selected in step 100. In typical gas and oil areas of interest, wells will have been drilled to explore or produce hydrocarbons in various geologic formations of interest. In the process of either additional exploration or development drilling, seismic data can be used to yield additional information about these geologic zones of interest, thereby increasing the probability of drilling successful wells. Zones of interest are selected which have characteristic elastic properties that lead to a diagnostic seismic response in an amplitude inversion.

The subterranean formation may include one or more reservoirs or producing zones. Also, preferably a well is located in the subterranean formation and logging tools have been run in the well to obtain subsurface property information about the elastic properties of geologic formations. Similarly, a seismic survey is taken over the subterranean region of interest using seismic sound sources and receivers which record reflected sound waves.

Well log data that can be used to calibrate and enhance seismic data are acquired in step 110. Most preferably, the well log data is obtained using logging tools that directly measure elastic properties. By way of example, and not limitation, these elastic properties include compressional velocity ($V_p$), shear velocity ($V_s$) and bulk density ($\rho$). Other non-limiting examples of well log data can be used to help derive elastic properties when elastic log data is not available include gamma, resistivity and NMR logs.

Elastic properties or statistics may also be obtained without directly logging a wellbore. For example, data from analogue wellbores or well log databases in similar geologic settings may be used. Alternatively, elastic properties or statistics can be inferred from statistical sedimentary models that create pseudo-well log data, geological models, or other informed estimates. Of course, those skilled in the art will appreciate that other types of data, such as core data, may also be acquired and used in accordance with this invention.

A subset of the well log data, which corresponds to the subsurface zone of interest from step 110, is selected in step 120. Alternatively, elastic properties or statistics call be selected from the other sources described above, which are appropriate to the subsurface or geologic zone of interest. Moreover, when multiple wells penetrate the same zone of interest and well log data varies between wells, the statistics from the multiple wells may be spatially interpolated or extrapolated to the regions of interest. Alternately, the zone of interest may be enlarged to include a larger geologic section. In this case the projected statistics are more likely to be characteristic of a larger zone of interest and less likely to bias results in an unfavorable manner.

Well processing algorithms and their parameters are selected in step 130. Some of these algorithms may be used to transform the subset of well log data into high signal-to-noise ratio well log data. For example, a suite of algorithms can be used to correct for wellbore environmental effects such as wellbore deviation, wellbore size, cement bond, casing corrections, wireline depth corrections, temperature effects, tool impulse response, etc.

Other algorithms are selected which can be used to transform high signal-to-noise ratio well log data into band-limited reflectivities. A particularly important well processing algorithm is the upscaling of well log data into the comparable dominant wavelengths that exist in the seismic data that is to be inverted. For example, Backus averaging, based on equivalent media theory, is often used in well log processing. Another selected algorithm is capable of converting high signal-to-ratio well log data, as a function of depth, into various raw reflectivities as a function of time. Examples of computed reflectivities include density, p-impedance, shear impedance, p-velocity, s-velocity, gradient reflectivity, hybrid shear, etc. as defined in Table 2.

Another well processing algorithm can be used to transform the raw reflectivities into band-limited reflectivities that have the same band-width as the seismic data (surface seismic data, vertical seismic profile, etc.) which is to be inverted. This transformation algorithm performs a convolution of a selected wavelet with the raw reflectivity.

The subset of well log data is transformed in step 140 into high signal-to-noise ratio well log data and then into band-limited reflectivities using the well log processing algorithms. As an alternative to obtaining the band-limited reflectivities using the log processing algorithms 130 of the well log data in step 110, the raw or band-limited reflectivities can alternatively be obtained directly from the above-mentioned databases, geologic models, sedimentary models or other informed estimates.

Figure 15:
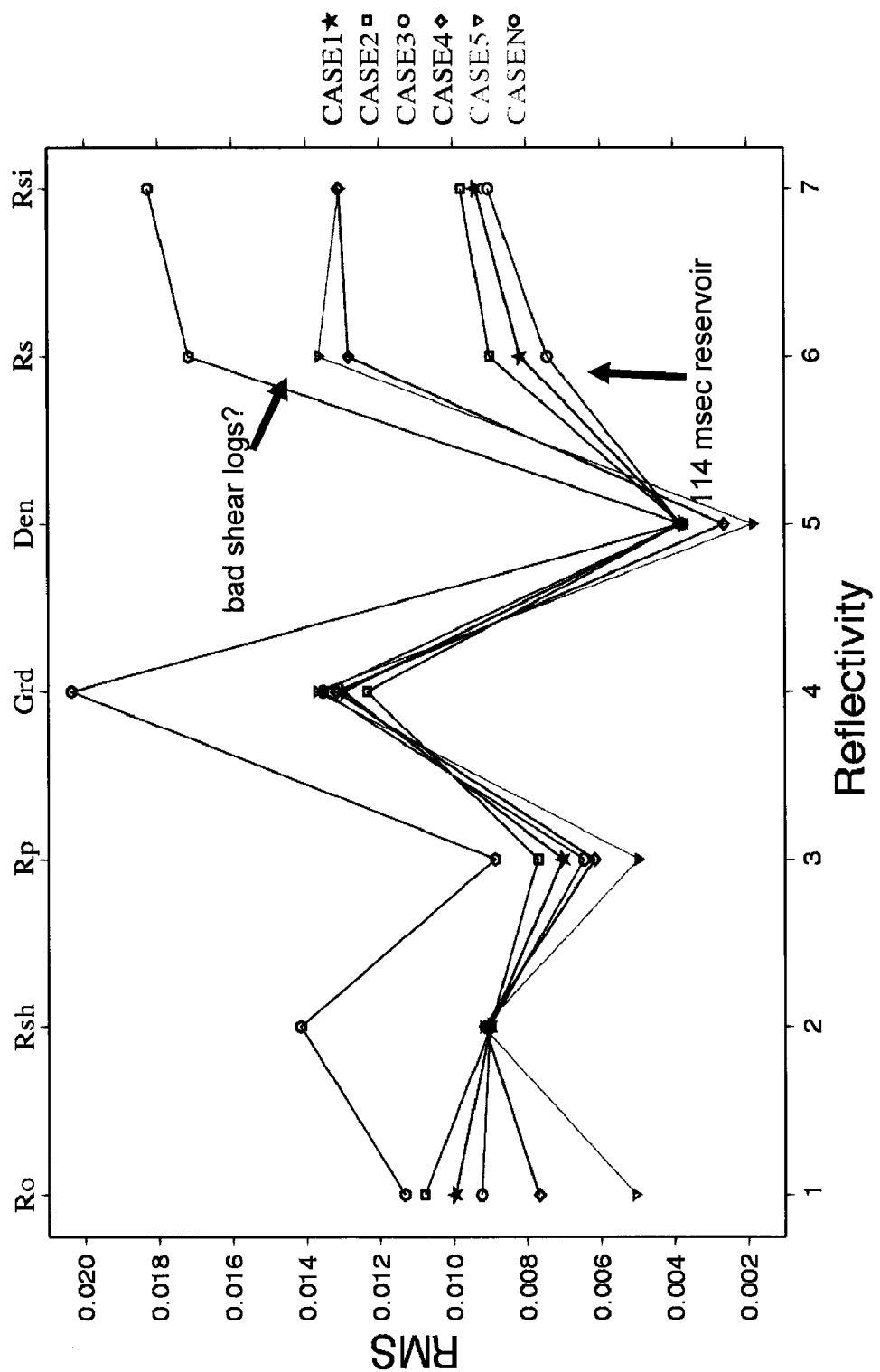
FIG. 15 shows the variations of RMS level measured in 4 different wells for 7 different types of reflectivities.
Figure 16:
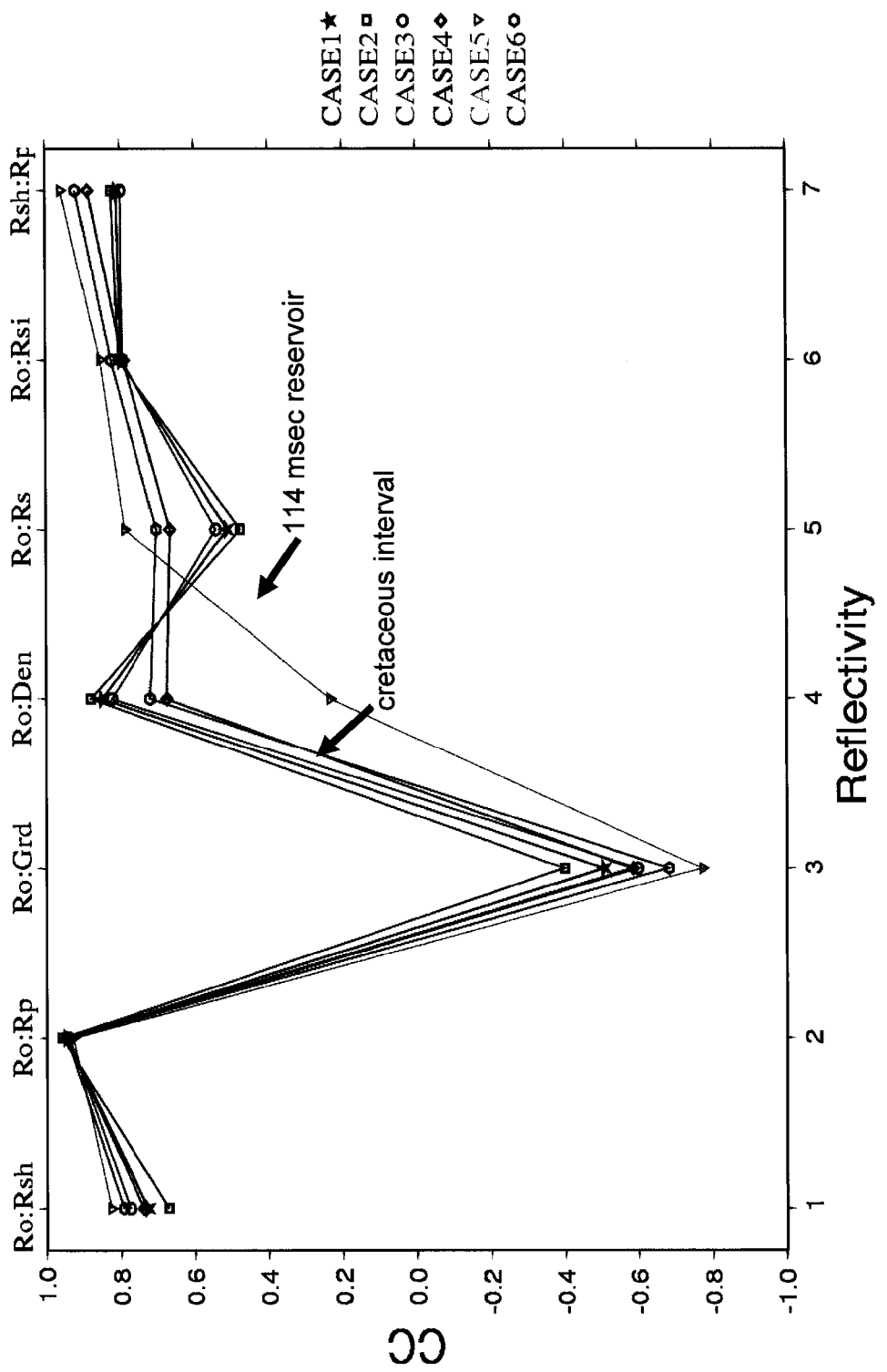
FIG. 16 shows the variations of correlation coefficients measured in 4 different wells between 7 different reflectivity, pairs.

The band-limited well reflectivities are then operated on to arrive at statistical well characterizations ($SCs_{well}$) in step 150. The characterizations are taken from large enough depth intervals so that their natural expected spatial variation in a zone of interest is slow and not strongly influenced by local anomalies, which makes the $SCs_{well}$ more useful in processing or inversion quality control. FIGS. 15 and 16 are examples of statistics measured from 4 wells spaced 10's of kilometers apart for some of the reflectivities that are listed in Table 2. There is a relatively small degree of variation of RMS shown in FIG. 15 and of correlation coefficient shown in FIG. 16 that suggests they might be used as inputs to statistical characterizations ill this area.

In addition to the fact that these statistical measures vary slowly in this areas measurements in other wells in different basins show very similar values for correlation coefficients and for relative RMS levels. This supports the use of these statistics for quality control in SCs in basins very distant from well control.

For situations in which the component reflectivities vary more rapidly between the wells, it may be necessary to spatially interpolate or extrapolate the desired statistical characterization to CRP gather locations of interest. Because reflectivities are functions of relative amplitudes rather than absolute amplitudes, statistical characterizations ($SCs_{seismic}$) are preferably unitless ratios. As a specific example, a statistical well characterization ($SC_{well}$) between two reflectivities may be obtained by computing the ratio of the RMS of the p-impedance to the gradient reflectivity over a depth range encompassing the zone of interest defined in step 100. This ratio has proven to be an extremely diagnostic and predictable indicator of AVO processing quality. Another useful diagnostic measure is the correlation coefficient of the measured p-impedance (zero offset) reflectivity, with the measured gradient reflectivity. These measures can be combined together to obtain a cross-correlation normalized by the autocorrelation of one of the reflectivities to produce a statistical characterization which itself may be spatially predictable. Useful relative statistical characterizations between p-impedance and gradient have included:

$SC = \sigma_G / \sigma_{R0}$
$SC = CC_{R0,G}$
and $SC = CC_{R0,G} \sigma_G / \sigma_{R0} = \Phi_{R0,G} / \Phi_{R0,R0}$ where: SC=statistical characterization between p-impedance and gradient
$\sigma_{R0}$, $\sigma_G$=rms's of p-impedance and gradient
$CC_{R0,G}$=correlation coefficient between p-impedance and gradient
$\Phi_{R0,G}$=cross-correlation between p-impedance and gradient
$\Phi_{R0,R0}$=autocorrelation of p-impedance.

In general, cross-correlations and autocorrelations from 2 or more reflectivities can be combined into a co-variance matrix whose properties including its eigenvector may be characteristic of the elastic properties of different geologic environments. In the preferred mode, a set of two or more reflectivities are chosen and a covariance matrix consisting of all zero-lag auto-correlations and cross-correlations is computed between the reflectivities. The eigenvalue of the principle eigenvector of this matrix yields a statistical characterization that naturally weights the statistical effect of all reflectivities and might be expected to have less spatial and temporal variability than a characterization of each individual reflectivity:

$SC_{well}$=principle eigenvalue [covariance ($R_0, R_1, \ldots R_N$)] (10)

where: $SC_{well}$=statistical well characterization
$R_0, R_1, \ldots R_N$=reflectivities of interest in seismic amplitude inversion $$\text{covariance} = \begin{pmatrix} \Phi_{R0,R0} & \Phi_{R0,R1} & \Phi_{R0,R2} & \ldots & \Phi_{R0,RN} \\ \Phi_{R1,R0} & \Phi_{R1,R1} & \Phi_{R1,R2} & \ldots & \Phi_{R1,RN} \\ \ldots & \ldots & \ldots & & \ldots \\ \Phi_{RN,R0} & \Phi_{RN,R1} & \Phi_{RN,R2} & \ldots & \Phi_{RN,RN} \end{pmatrix}$$

Another alternative involves computing the ratios of cross-correlations to autocorrelations (ie. signal-to-noise ratios) between reflectivity pairs, and then combining and weighting them in various ways to take advantage of expected differences in spatial variations. Weighting factors can be used to bias the statistical well characterization toward the signal-to-noise ratio of a selected set of reflectivities as follows:

$SC_{well} = \Sigma W_i (\Phi_{R0,Ri} / \Phi_{R0,R0}) = \Sigma W_i (CC_{R0,Ri} \sigma_{Ri} / \sigma_{R0})$ (11)

where: $W_i$=weight proportional to signal to noise ratio of statistical measure
$R_0$=reflectivity with high correlation and signal to noise ratio
$R_i$=ith reflectivity of interest
$\sigma_{R0}$, $\sigma_{Ri}$=rms of $R_0$ and $R_i$ reflectivity
$CC_{R0,Ri}$=correlation coefficient between $R_0$ and $R_i$ reflectivities
$\Phi_{R0,Ri}$=cross-correlation between $R_0$ and $R_i$ reflectivities
$\Phi_{R0,R0}$=autocorrelation of $R_0$ reflectivity With both of equations (10) and (11), one can compute a statistical well characterization ($SC_{well}$) based upon those reflectivities that may be of interest in a particular geologic setting.

In step 160, for example, seismic data is acquired over the subsurface zone of interest, described above with respect to step 100. This seismic data may be acquired in a variety of geologic settings including on land, offshore or deep water locations and in variety of field types including 2-D, 3-D, 4-D, VSP, multi-component, and time lapse. Preferably, this seismic data is recorded with dense source and receiver sampling and using shot-to-receiver offsets that allow for high angle subsurface reflections (up to 60 degrees) in the subsurface zone of interest. Another highly desirable characteristic of the acquisition is to utilize high bandwidth sources and small receiver arrays.

In step 200, seismic data is processed using a series of processing steps 210. It is preferable in step 200 to maximize seismic data signal-to-noise ratio and bandwidth in order to obtain enhanced seismic data that is appropriate as input to an amplitude inversion. In particular, seismic amplitudes are generated which are preferably within a single scalar constant of band-limited, plane wave, angle-dependent subsurface reflectivity. Such seismic data will achieve the desirable goal of requiring minimal constraints within an amplitude inversion.

An amplitude processing sequence may have 20 or more steps including those in shown in Table 4. Non-limiting examples of major seismic processing steps typically include:
a) regularizing seismic data;
b) noise suppression;
c) correction for various earth transmission/acquisition effects;
d) deconvolution;
e) velocity and anisotropy estimation;
f) migration;
g) wavelet spectral equalization/destretch:
h;) wavelet phase equalization;
i) residual event alignment;
j) spatial amplitude balance,
l) offset amplitude balance:
m) spatial and temporal filtering;
n) offset/angle selection and mute; and
o) reflectivity inversion.

The general objective of these processing steps, except for the inversion step, is to remove noise from the seismic data and correct the response at each interface so that it corresponds to the convolution of a wavelet with known amplitude, phase and timing with the interface's angle-dependent reflection coefficient. Because steps g) to n) and parameter values used for these steps can significantly impact the results of the inversion step, they are strong candidates for the SDM method of step 300, as well as merely changing the order of such steps or performing certain selected steps while not performing others. For other pre-imaging steps, SDM may be very inefficient and ineffective as a parameter selection procedure.

Referring again to FIG. 13, an exemplary set of steps pertaining to step 210 will be described in more detail. In step 205, a subset of seismic data which includes data corresponding to the zone of interest is selected from the seismic data of step 160. Preferably, this subset of seismic data includes the whole data set of step 160 (and processing steps are selected to enhance a subset of the seismic data which corresponds to the zones of interest). It is also possible to select a small, proper subset of the seismic data from step 160 to process in further steps comprising step 210.

A set of seismic processing steps is selected in step 215. The seismic processing steps include sets of processing parameters and parameter values which are to be optimized in one or more of the processing steps. Examples of the seismic processing steps for which parameters must be selected include but are not limited to all the processing steps listed above for step 200 and in Table 4. The selection can also pertain to the selection of steps themselves and the order of steps in the processing sequence can also be varied. As noted above, it is computationally difficult to optimize all the parameters in all the steps at one time.

From the above set of processing algorithms, one or a combination of the algorithms is selected to have its parameters varied during optimization. For example, parameters in a deconvolution algorithm could be selected for optimization while the parameters for intervening processing steps, i.e, such as noise suppression and for the velocity inversion are held fixed. Consequently, within each of the important steps a set of parameters are optimized while parameters in remaining steps are set and held at fixed values.

Next in step 220, the subset of seismic data is processed into enhanced seismic data using the selected seismic processing steps and at least one variable parameter value with other parameter values fixed.

The enhanced seismic data is inverted in step 225 using a selected amplitude inversion algorithm employing equations (2) or (6) or others used in AVO analysis studies, and a fixed set of inversion parameters to generate inverted reflectivities. For example, the inversion algorithm may be a two term algorithm which inverts for intercept and gradient reflectivities using constant damping parameters. Alternatively, a three term inversion algorithm may used to produce a set of three selected reflectivities. Those skilled in the art will appreciate that many other alternative inversion algorithms may be used in this step.

The inverted reflectivities are operated on in step 230 to arrive at a statistical seismic characterization for a set of trial parameter values. Preferably, the same characterization algorithm that is used for the well data is used for the seismic statistical characterization. The set of inverted reflectivities that are used for this calculation are selected from the same zone of interest as step 100. All or a subset of common reflection point gathers (CRPs) from a 2D or 3D seismic data set is chosen from the zone of interest. For each of the CRP's, a statistical characterization is computed from the inverted reflectivities at that CRP. These statistical characterizations are averaged to produce a single statistical characterization for the particular trial set of parameter values.

The difference between the statistical well characterization from step 150 and the statistical seismic characterization ($SC_{seismic}$) of step 230 is computed using equation (8) to produce a statistical difference measurement (SDM), i.e., a "statistical difference measurement" for a particular set of trial processing parameter values. For the purposes of this specification, the term "measure of goodness" indicates a correlation of statistical seismic characterization ($SC_{seismic}$) and statistical well characterization ($SC_{well}$) measurements.

New sets of trial processing parameter values are next selected in step 245 to be used in the trial processing algorithms while the parameter values of remaining processing algorithms will again be held fixed. An objective of repeating steps 220-240 is to find the optimal SDMs for the set of trial parameter values. If the expected SDM surface is simple, a systematic evaluation of the SDM for a grid of parameter values can efficiently locate the minimums SDM. Each of the parameters has ail expected range of potential values which can be used to define a grid of possible parameter values. The grid of possible parameter values is used to create an SDM curve or surface by computing SDM values at grid locations by repeating steps 220-240.

If the SDMs surface is expected to be very complicated or when the SDM surface is multidimensional, numerical and/or analytical derivatives computed in a region around the initial trial parameter value can be used to create a local model of the SDM surface. This model is then used to select a new trial set of parameter values close to the minimum of the modeled SDM surface. Those skilled in the art will appreciate that mans other techniques may be used to sample the SDM surface for the array of parameters.

In step 245, various strategies are employed to select new trial parameter values that will efficiently locate the minima on the SDM surface. As noted above, if the expected SDM surface is simple, a systematic evaluation of the SDM for a grid of parameter values and repeating of steps 220-240 may efficiently locate the optimum (i.e. minimum) SDM. The SDM curves and surfaces in FIG. 17 were both generated using a grid search of parameter values. Alternately, numerical and/or analytical derivatives computed in a region around the initial trial parameter value can be used to create a local model of the SDM surface. This model is then used to select a new trial set of parameter values close to the minimum of the modeled SDM surface.

Figure 17:
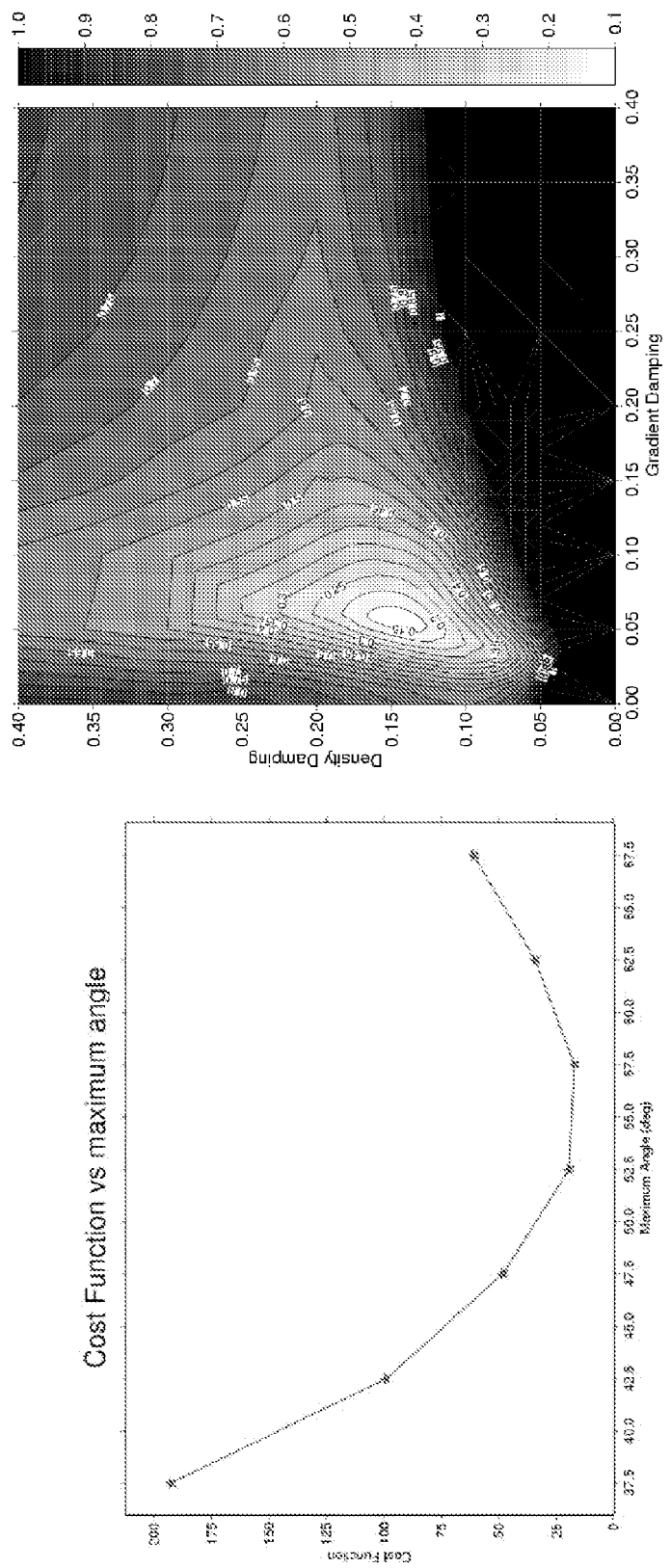
FIG. 17 shows examples of the use of SDMs to select angle range parameters and to select inversion damping parameters.
Figure 18A:
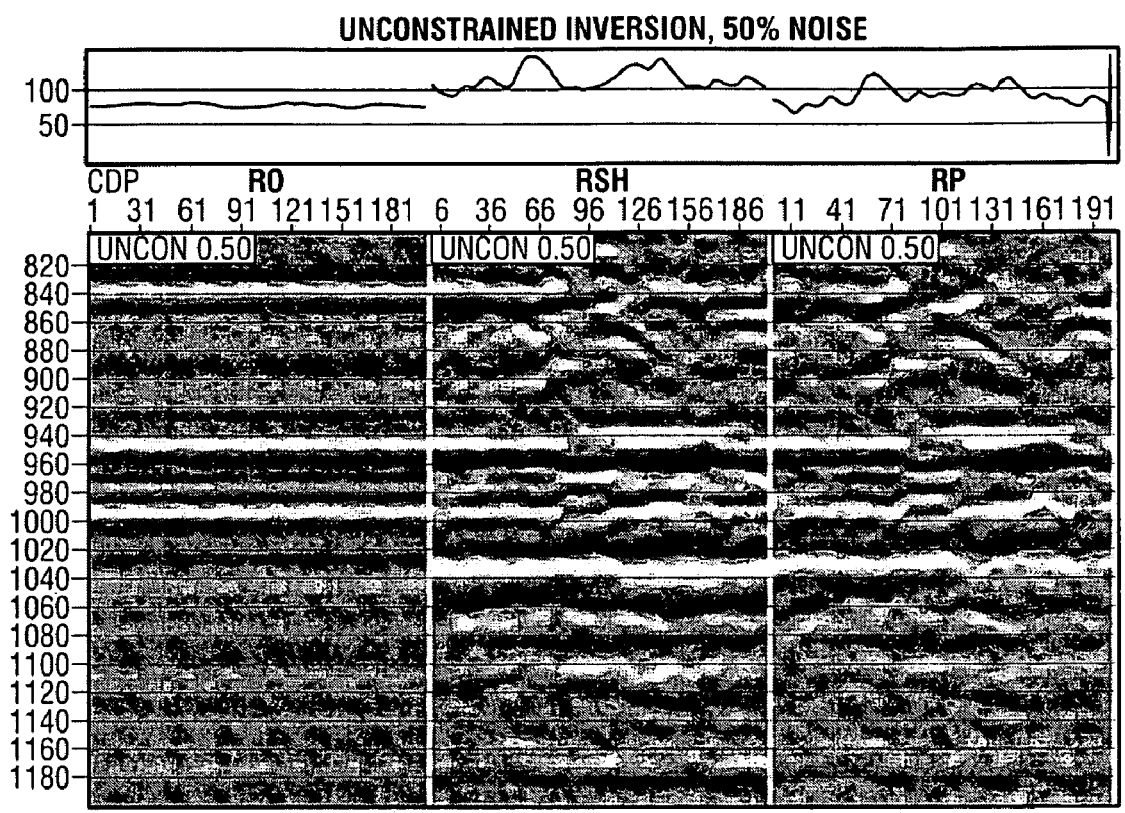
FIGS. 18A-18D show the improvement in inverted reflectivity output when optimized damping parameters are used in a reflectivity inversion.
Figure 18B:
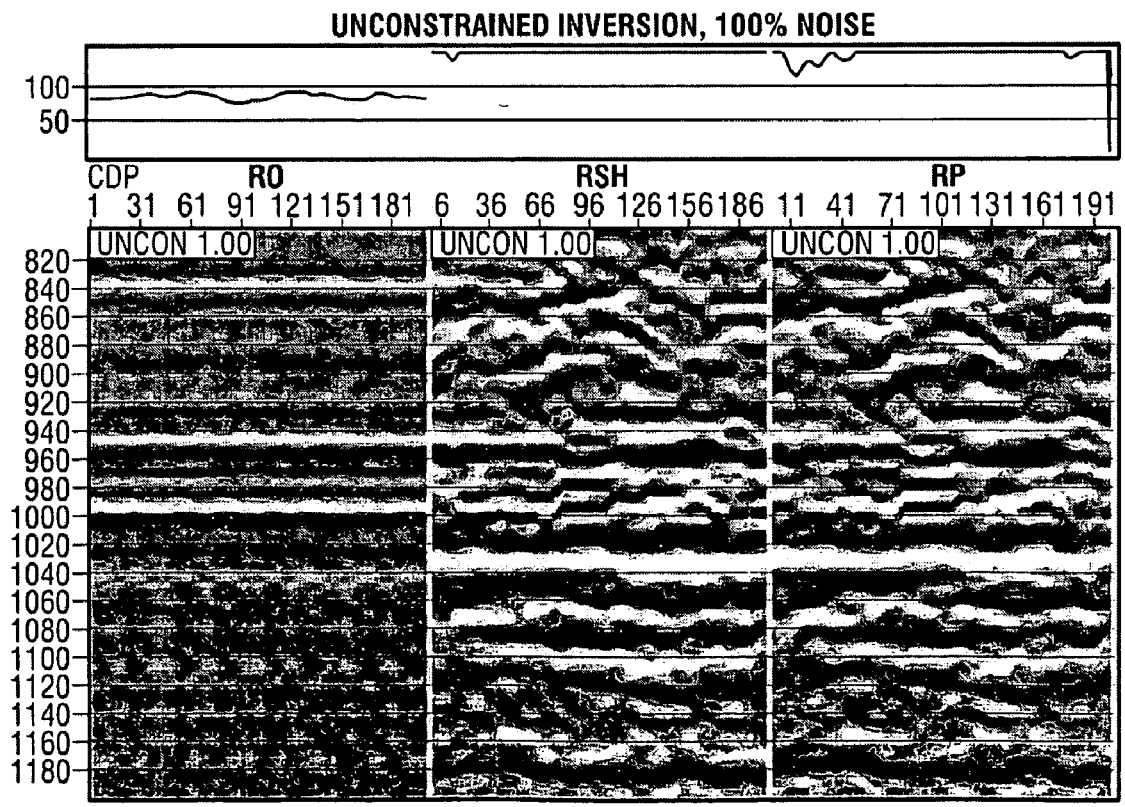
Figure 18C:
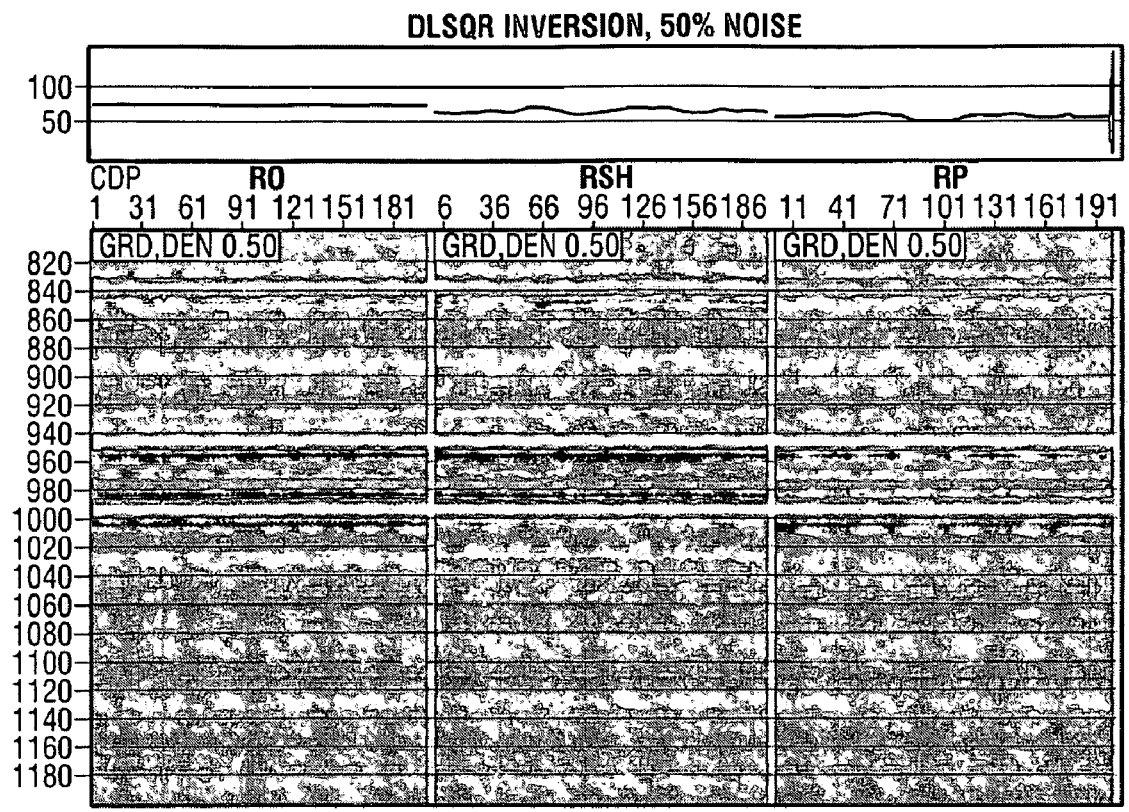
Figure 18D:
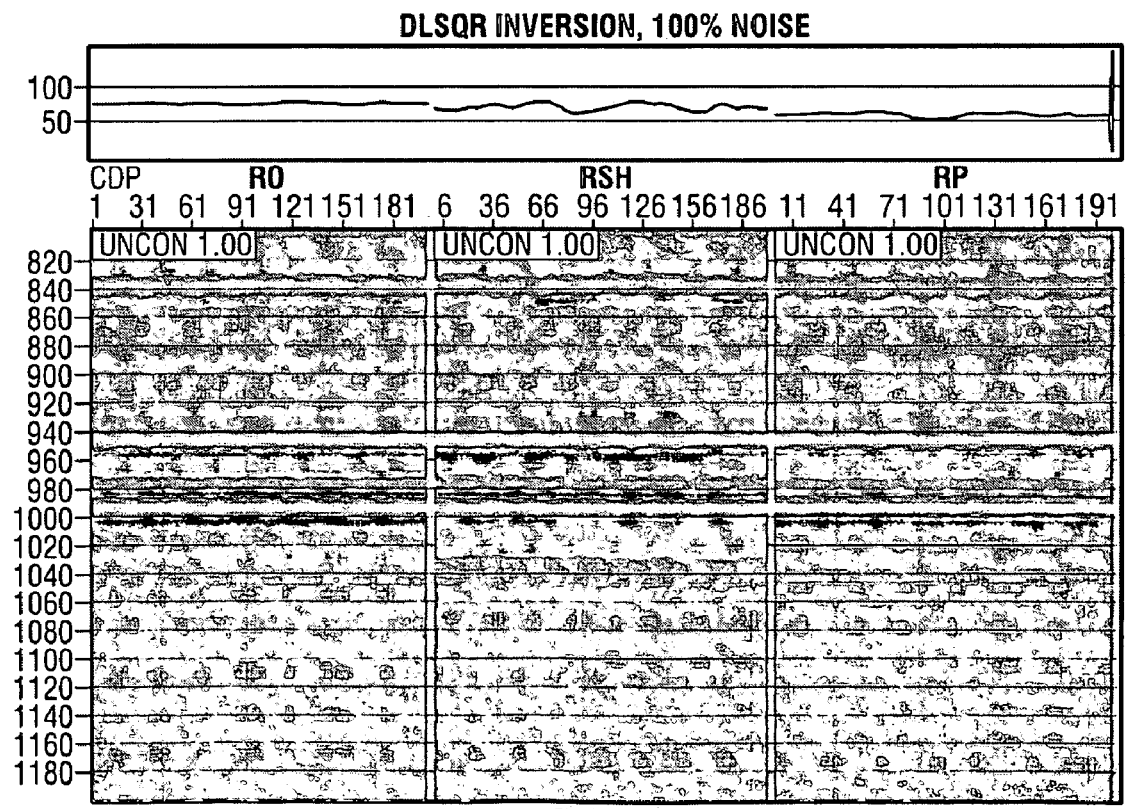
Figures 1, 19A:
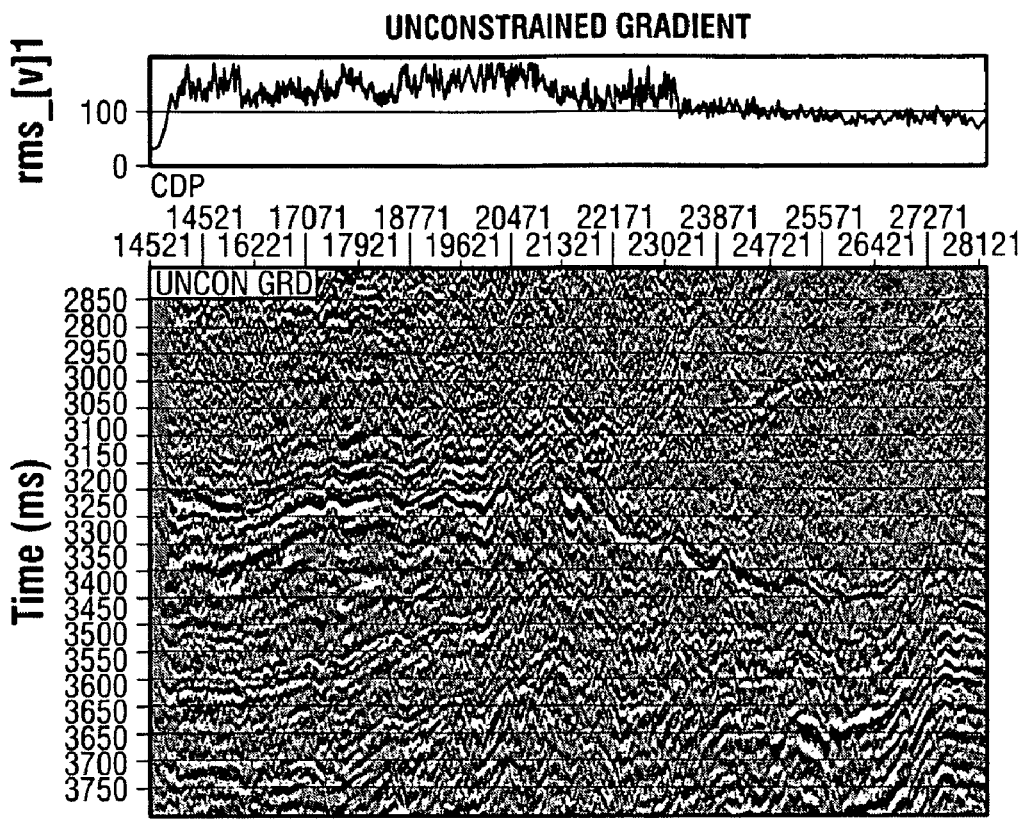
Figures 2, 19A:
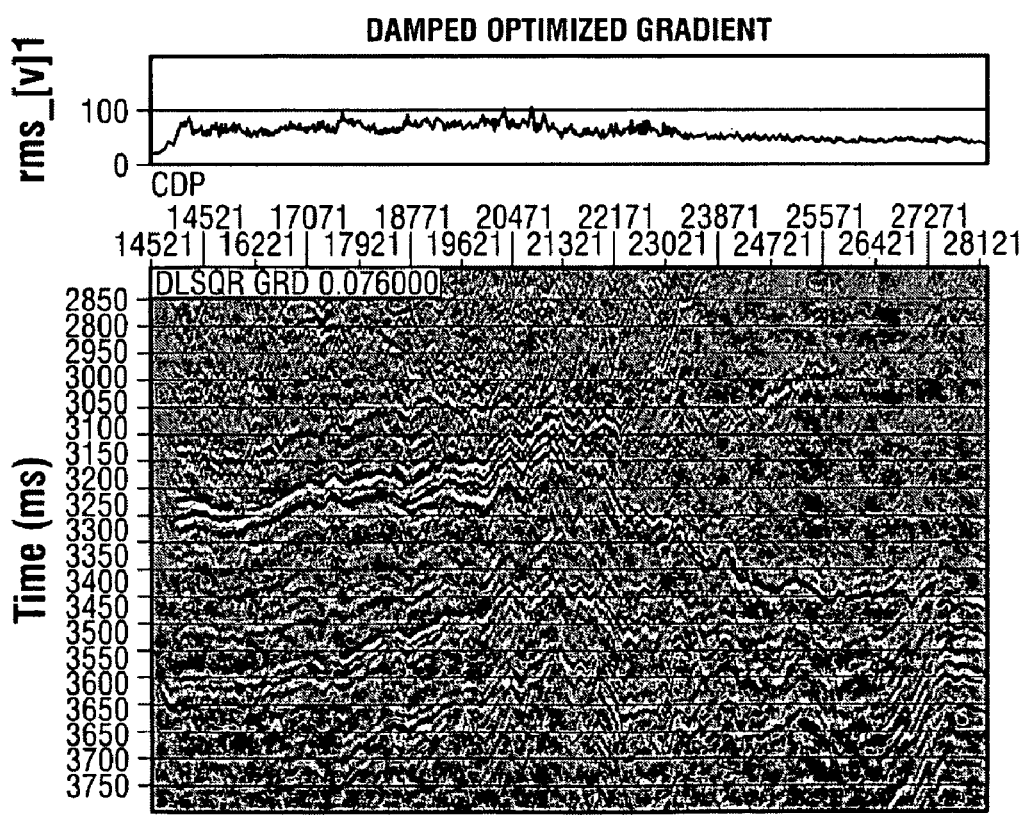
Figures 1, 19B:
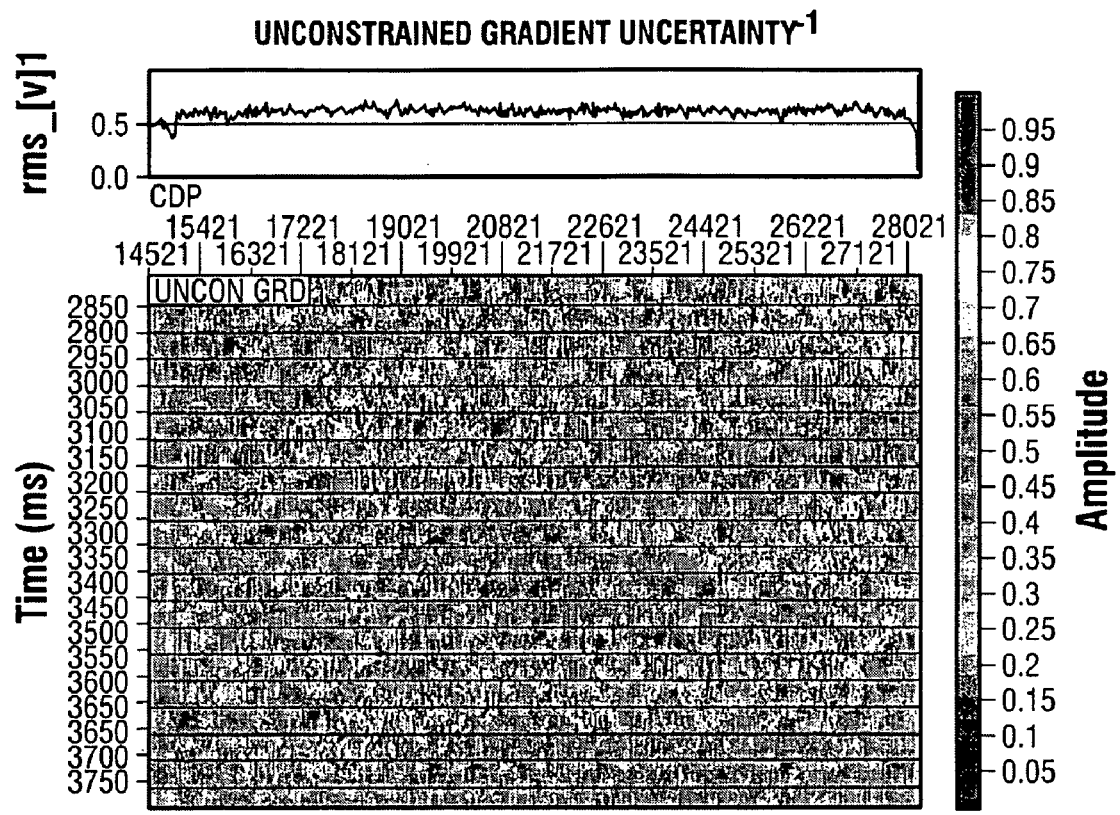
Figures 2, 19B:
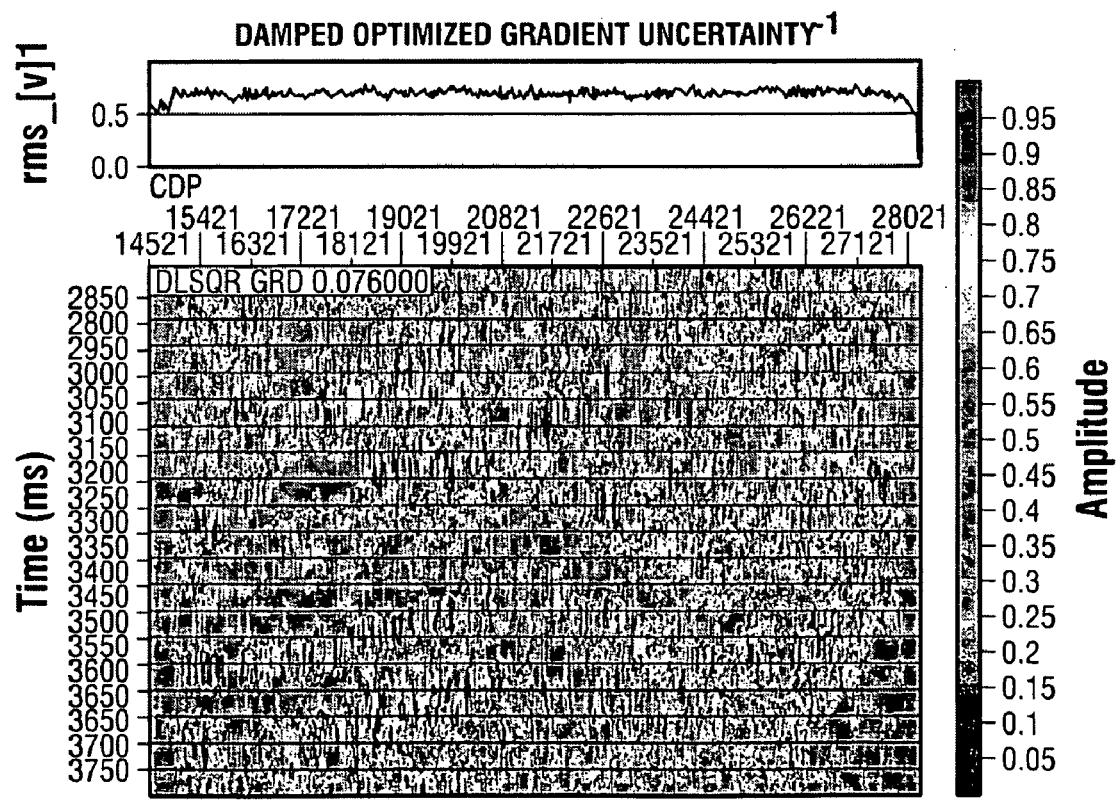

In step 250 the set of processing parameter values which correspond to the optimal SDM are selected. FIG. 17 is an example of how the SDMs can be used to choose a data selection (angle mute) parameter for a particular zone of interest. The graph shows a curve of SDM values as a function of various angle mute values. It defines a maximum reflection angle that positively contributes to the amplitude inversion by minimizing the computed SDM. The amplitude data from reflection angles greater than this angle are then removed (muted) from the CRP gathers.

In step 260, the entire set of seismic data is processed with the set of processing parameter values selected in step 250 to produce enhanced seismic data as the output from a single processing step 210. The whole data set is processed only thru the selected step 210 and is the input data to the next selected step 210.

Referring again to FIG. 14 which describes step 300, the final output of enhanced seismic data from step 200 is inverted for reflectivities using the optimized amplitude inversion flow of steps 310-380. The data from step 200 in obtained in step 310 and a subset of the enhanced seismic data is selected in step 320 from the enhanced processed seismic data of step 200. This selected subset of seismic data should correspond to the subset of well log data selected in step 150. In a first preferred maimer, this selection of the subset of seismic data includes all the seismic traces that correspond to the same depth interval as the well log data. Alternatively, the selection of the seismic data may be a decimated subset of the whole seismic data survey.

In step 330 the subset of enhanced seismic data, using a selected seismic inversion algorithm and a trial set inversion parameter values is inverted into band-limited inverted reflectivities. In a preferred example, the inversion algorithm may be a constrained least squares solution to equation (6)'s error function requiring values for both damping parameters and data weighting parameters. In general, in order to reduce the effects of residual noise and signal distortion in the seismic data, reflectivities are constrained relative to one another by the selection of damping parameter values and data weights (i.e. The $W_i$'s, $W_C$'s and $W_f$'s in equation (6)) Because damping tends to bias results away from the amplitude data, large damping weights are undesirable, an admission that the seismic amplitude data itself will have less than full influence on the resulting reflectivities. For very large damping factors, some attributes may effectively be constrained to be a scaled version of other attributes.

Alternatively, equation (6) without an $R_2$ term might be used to determine inversion parameter values. Those skilled in the art will appreciate that other inversion algorithms could also be used and are not limited by these examples.

In step 340 the band-limited seismic reflectivities are then operated on to arrive at various statistical seismic characterizations identical to the ones that are generated from well control and described above under step 150. Preferably, because of its good lateral predictability, the selected SC will be the principle eigenvector of the covariance matrix calculated from the inverted seismic reflectivities.

In step 350, the statistical seismic characterization is compared to the statistical well characterization to produce a statistical difference measurement (SDM) using one of the forms of equation (8).

In step 360, steps 330-350 are repeated to locate the amplitude inversion parameter values which optimize (minimize) the SDM. The strategies for doing this are similar to those in step 245. Preferably this step is implemented by doing trial amplitude inversions using equation (6) for a grid of possible damping parameter values. An SDM is output for each of the damping parameter values and the grid of values is analyzed for minima. As an alternative, derivatives of the SDM, as a function of the parameter values, can be evaluated and local minima identified to arrive at optimized combinations of parameter values.

The SDMs can also be checked to see whether they correspond to satisfactory damping or processing parameters. An extremely important criteria is the magnitude of the damping parameters associated with the minimum SDM. In cases when two local minima of nearly equal SDM value are located, the minimum associated with the smallest damping parameters will be selected. Another criteria which may also be used is the spatial coherence of the inverted reflectivities. This criteria must be used in conjunction with other criteria because it is quite possible for a reflectivity like the gradient to be very spatially coherent and very erroneous at the same time. Yet another criteria may be the magnitude of the SDM. If any of these predetermined criteria are not met, then steps 210-370 may repeated with newly selected processing algorithms and/or seismic parameters until the predetermined criteria are met. If the SDMs are sufficiently low, then the inverted seismic reflectivities are satisfactory.

Examples of other optimized parameter searching routines which can be used, by way of example and not limitation include methods which employ Taylor series expansions or Newton approximations to the error surface. Those skilled in the art will appreciate many other methods may be employed to efficiently search for optimal SDMs including using previously determined inversion parameters in an area of interest.

The right side of FIG. 17 shows a contoured surface of the SDM values corresponding to the grid of gradient and density damping parameter values. The minimum SDM value and the associated parameters producing that value are selected. The minimum is the last closing contour in FIG. 17 corresponding to density damping value of 0.14 and a gradient damping of 0.06. values which are roughly in proportion to the relative RMS levels of these parameters as measured in well control. The fact that the SDM surface shows large variations for small changes in the damping parameter value reflects the difficulty of trying to select damping parameters without employing trial parameter values. In fact because damping parameter values are difficult to select based on existing quality control met-hods that use spatial coherence, or absolute RMS levels, constraints are often not even used ($W_C$'s=0 in equation (6) ) in manly inversion algorithms.

In step 370 the enhanced seismic data is inverted using the set of inversion parameter values selected in step 360 to produce a set of optimized inverted reflectivities;

FIGS. 18A-18D show p-impedance, hybrid shear and p-velocity reflectivity results for unconstrained (no damping) and constrained (damped) inversions of a synthetic data set. The two cases shown have 50% and 100% noise (coherent and incoherent) added to the CRP gather signal traces. Because the p-impedance, hybrid shear and p-velocity reflectivities signals are identical at each CRP and highly correlated with one another, the correct results should be nearly identical and spatially coherent reflectivities. As shown on the top (FIGS. 18A & 18C), an unconstrained inversion for p-impedance produces good results while the hybrid shear and p-velocity reflectivities have low signal to noise ratios as evidenced by spatial incoherence and relatively high RMS values. The displays on the bottom (FIGS. 18B & 18D) indicate that when optimal damping constraints are selected using the SDM method, the spatial coherence and relative RMS's of the hybrid shear and p-velocity reflectivities significantly improves.

FIGS. 19A-1&2 and 19B-1&2 are real seismic data example comparing an undamped gradient section on the left with an optimally damped gradient section on the right in which the optimally damped parameter values have been chosen using the SDM method of this patent. The large drop in gradient RMS level shown at the top of the section accompanied by a large increase in spatial coherence are both indicators that the SDM damped gradient section has a significantly higher signal to noise ratio than the undamped gradient section.

Not only inverted reflectivities but also their uncertainties ((N+S)/S) are needed as inputs to quantitative amplitude analysis techniques. In step 380, SDMs calculated for pairs of reflectivities can be used to estimate relative S/(S+N) values (uncertainty[1]) for each of the inverted reflectivities. These can be obtained by computing the difference between statistical characterizations (SCs) calculated for seismic inverted reflectivities and SCs projected from well control using the following equation:

$$U_{R1} = SC_{well,R1R2} / |((SC_{well,R1R2}, -SC_{seismic,R1R2})| + SC_{well,R1R2}))$$ (9)

where: $U_{R1}=S/(S+N)$ ratio (uncertainty$^{-1}$) associated with reflectivity $R_1$ $SC_{well,R1R2}=\Phi_{R1R2}/\Phi_{R1R1}$ cross & autocorrelation for $R_1, R_2$ from well control $SC_{seismic,R1R2}=\Phi_{R1R2}/\Phi_{R1R1}$ cross & autocorrelation for $R_1, R_2$ from seismic Similarly they can be estimated by comparing differences in output between constrained (damped, weighted) and unconstrained amplitude inversion.

The SDMs of one of the reflectivities, preferably a p-impedance or a stack reflectivity have a high S/(S+N) relative to one for which S/(S+N) estimates are desired. They employ the same kind of statistical characterizations between pairs of traces to quantify the uncertainty in each of the inverted reflectivities.

Figure 20:
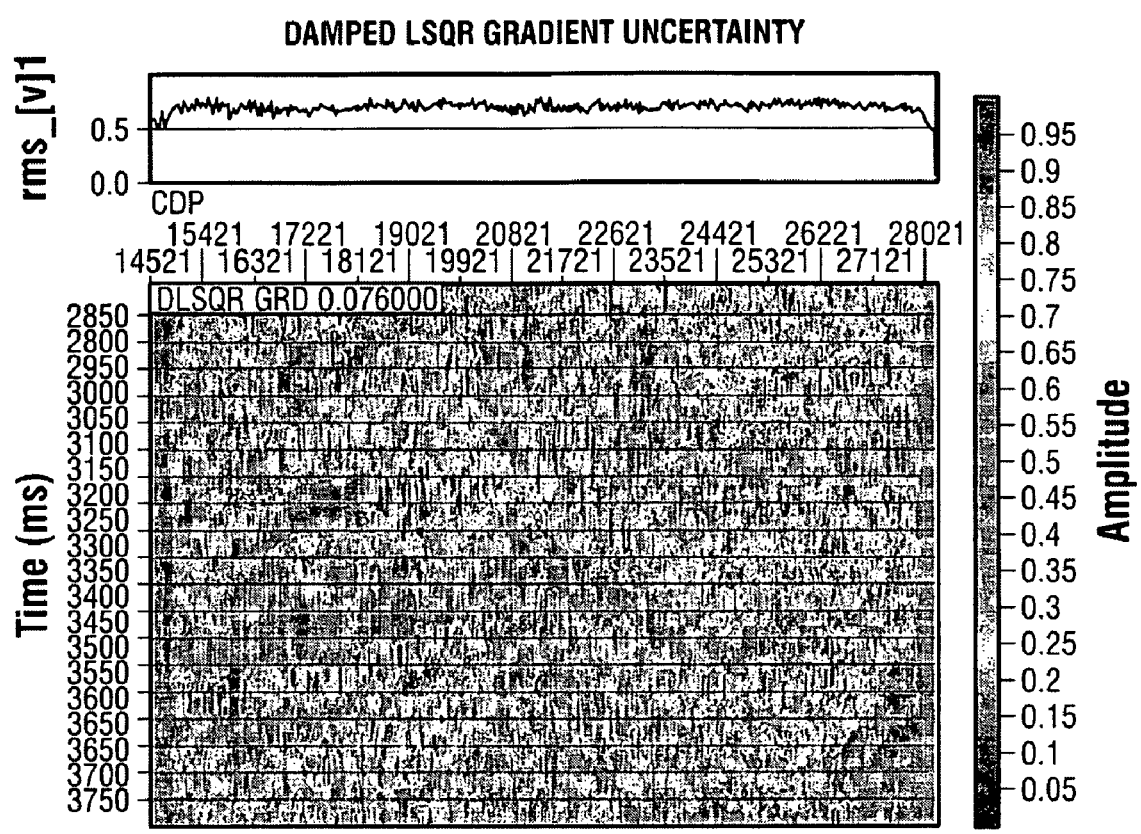
FIG. 20 displays S/(S+N) estimates from the unconstrained and constrained (damped) gradient displays of FIGS. 19A-1&2 and 19B-1&2.
Figure 21:
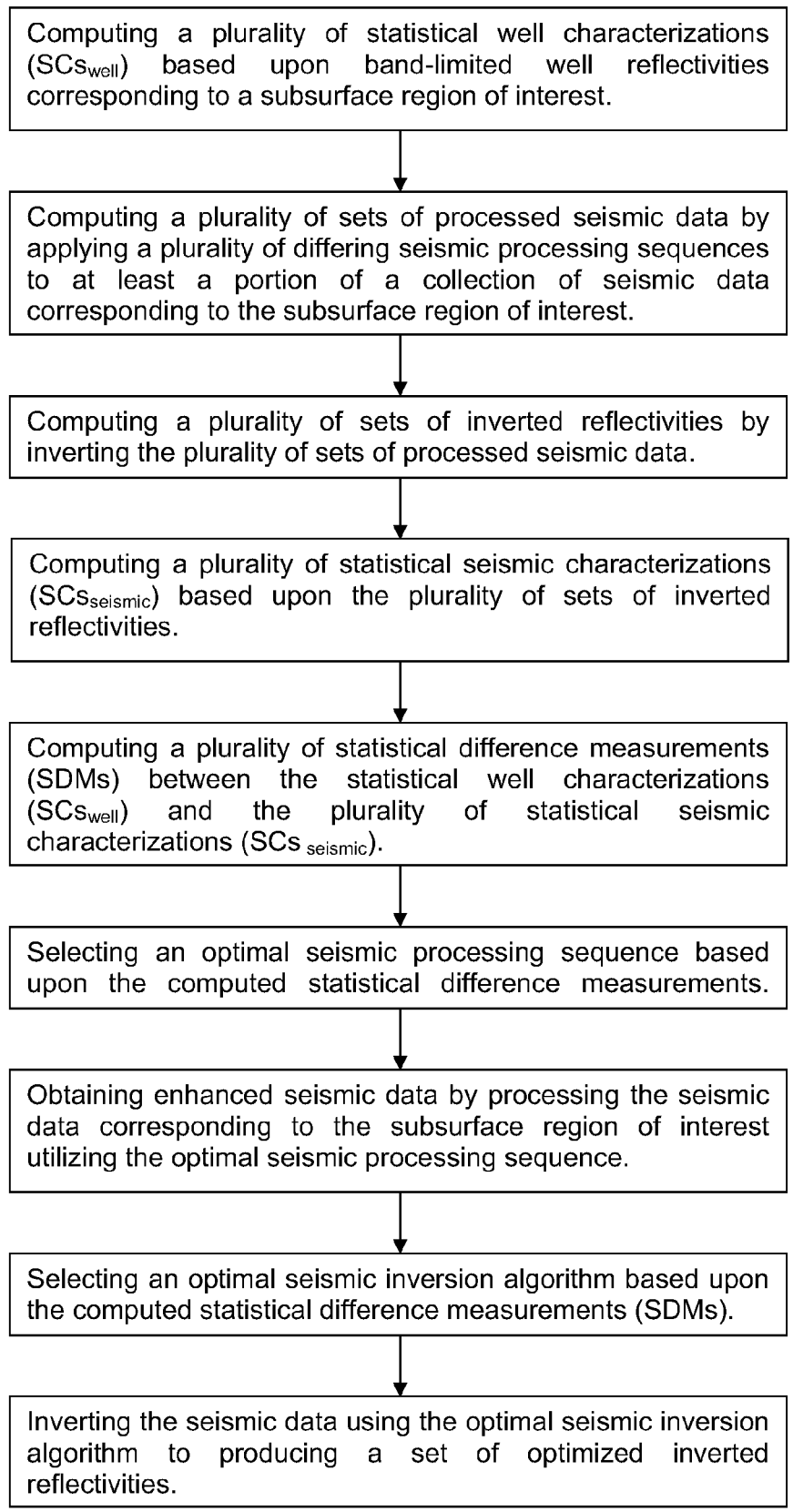
FIG. 21 is a flowchart describing steps taken, in an embodiment of the present invention, to produce an optimized set of seismic reflectivities and statistical difference measurements (SDMs) from the well log data and seismic data.
Figure 22:
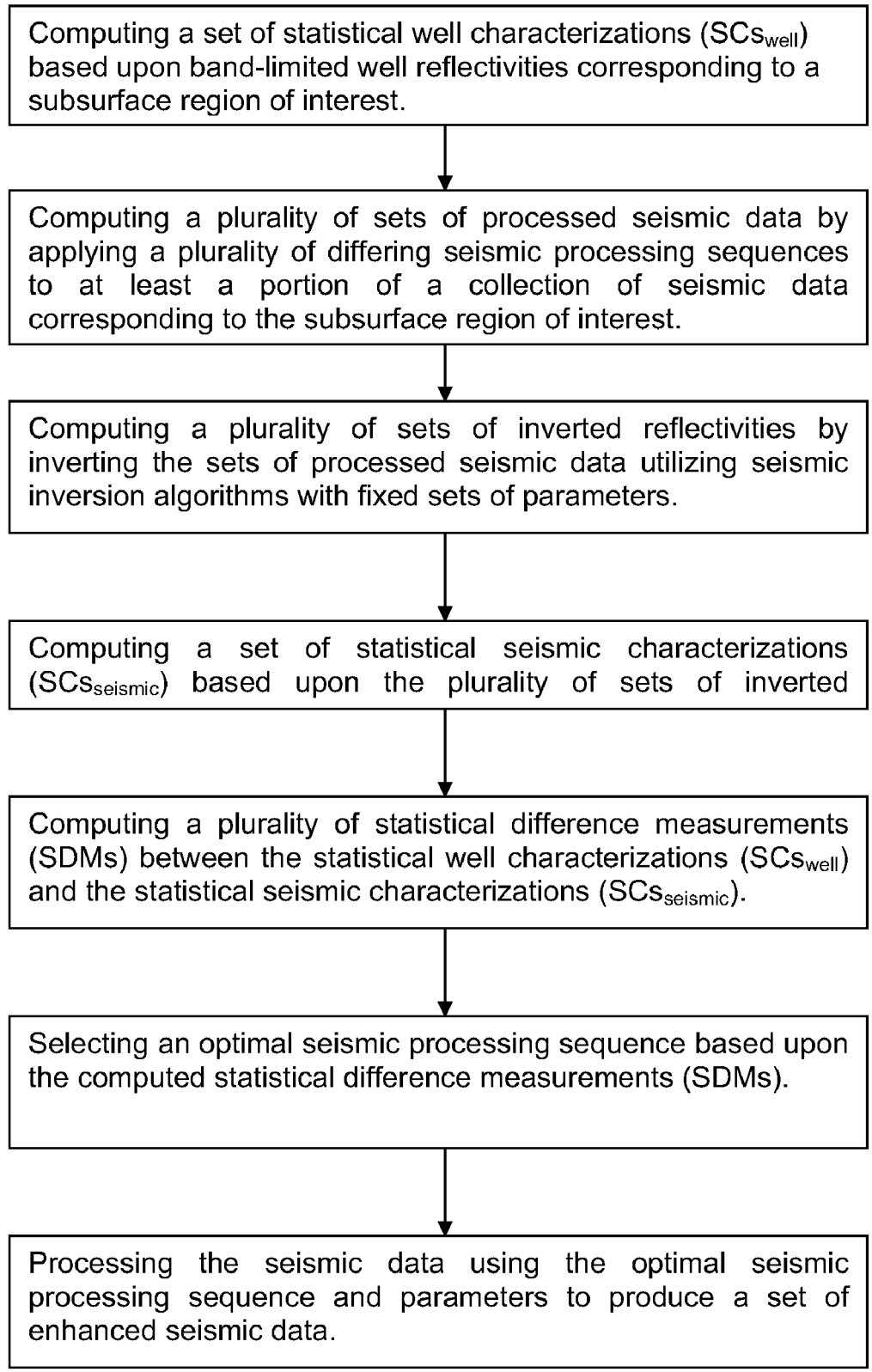
FIG. 22 is a flowchart describing steps taken, in another embodiment of the present invention, to produce enhanced seismic data and statistical difference measurements (SDMs) from the well log data and seismic data.
Figure 23:
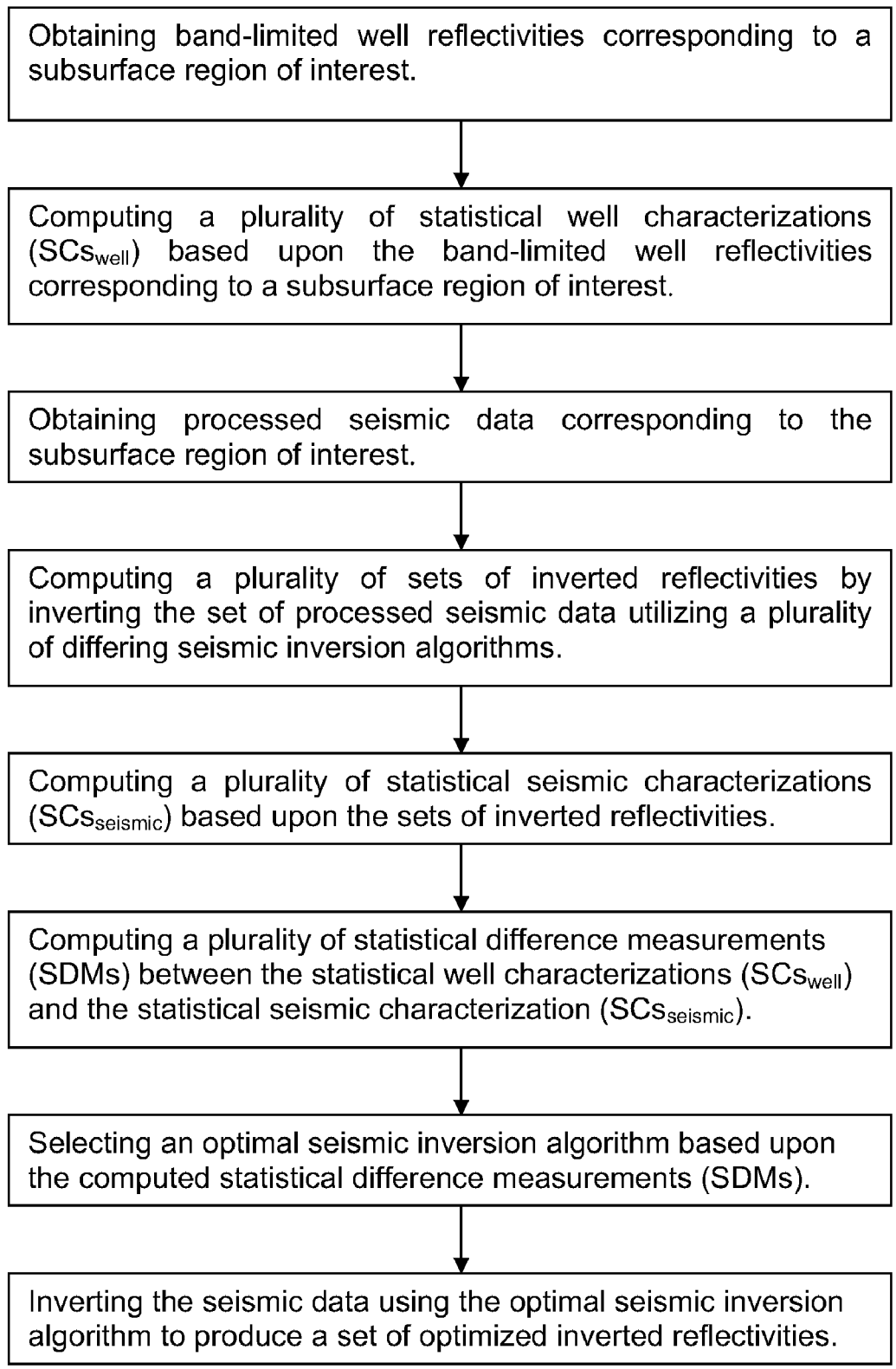
FIG. 23 is a flowchart describing steps taken, in another embodiment of the present invention, to produce an optimized set of seismic reflectivities and statistical difference measurements (SDMs) from the well log data and seismic data.

FIG. 20 shows changes in S/(S+N) as a function of CRP and time for the gradient sections shown in FIGS. 19A-1&2 and 19B-1&2. There is a large increase in S/(S+N) when SDM selected damping parameters are chosen for the inversion.

In step 390 the set of optimized inverted seismic reflectivities and associated uncertainty values are output. These outputs are used in various amplitude analysis techniques to reduce risk associated with seismic data driven exploration and field delineation decisions.

While in the foregoing specification this invention has been described in relation to certain preferred embodiments thereof, and many details have been set forth for purpose of illustration., it will be apparent to those skilled in the art that the invention is susceptible to alteration and that certain other details described herein can vary considerably without departing from the basic principles of the invention.

What is claimed is:

1. A method for obtaining enhanced seismic data and optimized inverted reflectivities, the method comprising:
    (a) computing a plurality of statistical well characterizations ($SCs_{well}$) based upon band-limited well reflectivities corresponding to a subsurface region of interest;
    (b) computing a plurality of sets of processed seismic data by applying a plurality of differing seismic processing sequences to at least a portion of a collection of seismic data corresponding to the subsurface region of interest;
    (c) computing a plurality of sets of inverted reflectivities by inverting the plurality of sets of processed seismic data;
    (d) computing a plurality of statistical seismic characterizations ($SCs_{seismic}$) based upon the plurality of sets of inverted reflectivities;
    (e) computing a plurality of statistical difference measurements (SDMs) between the statistical well characterizations ($SCs_{well}$) and the plurality of statistical seismic characterizations ($SCs_{seismic}$);
    (f) selecting an optimal seismic processing sequence based upon the computed statistical difference measurements (SDMs);
    (g) obtaining enhanced seismic data by processing the seismic data corresponding to the subsurface region of interest utilizing the optimal seismic processing sequence;
    (h) selecting an optimal seismic inversion algorithm based upon the computed statistical difference measurements (SDMs); and
    (i) inverting the seismic data using the optimal seismic inversion algorithm to produce a set of optimized inverted reflectivities.

2. The method of claim 1 wherein, the differing seismic processing sequences include parameters, and at least the values of the parameters differ between the differing processing sequences.

3. The method of claim 1 wherein, the differing seismic processing sequences differ at least by differing an order of processing steps within each respective seismic processing sequence.

4. The method of claim 1 wherein, the differing seismic processing sequences differ at least by differing a number of processing steps within each respective seismic processing sequence.

5. The method of claim 1 wherein the statistical difference measurements (SDMs) are utilized in an optimization scheme to predict the optimal seismic processing sequence.

6. The method of claim 1 wherein, the band-limited well reflectivities are computed without using well log data obtained from logging a wellbore in the region of interest.

7. The method of claim 1 wherein, step (a) further comprises:
    i. acquiring well log data;
    ii. selecting well log processing algorithms with well log processing parameters; and
    iii. transforming the well log data into band-limited well reflectivities using the well log processing algorithms.

8. The method of claim 7 wherein, the well log data is acquired from one of a wellbore in the region of interest, an analogue geologic setting, an average of a number of analogue wells, and a statistical model.

9. The method of claim 1 wherein, step (f) further comprises determining whether any of the statistical difference measurements (SDMs) are within a predetermined criteria.

10. The method of claim 1 wherein, the statistical well characterizations ($SCs_{well}$) are computed based upon RMS levels of shear, compressional and density reflectivities and correlation coefficients among shear, compressional and density reflectivities.

11. The method of claim 1 wherein, the statistical difference measurement (SDM) is responsive to the ratio of S/(S+N) of well reflectivities to the S/(S+N) of seismic data reflectivities.

12. The method of claim 8 wherein, the statistical well characteristics are used in a Zoeppritz reflectivity equation to compute the expected RMS of seismic traces in an AVO gather.

13. The method of claim 1 wherein, the statistical difference measurement (SDM) is inversely proportional to the difference between the expected S/(S+N) ratio of well reflectivities and the S/(S+N) ratio of seismic data reflectivities.

14. A method for obtaining enhanced seismic data, the method comprising:
    (a) computing a set of statistical well characterizations ($SCs_{well}$) based upon band-limited well reflectivities corresponding to a subsurface region of interest;
    (b) computing a plurality of sets of processed seismic data by applying a plurality of differing seismic processing sequences to at least a portion of a collection of seismic data corresponding to the subsurface region of interest;
    (c) computing a plurality of sets of inverted reflectivities by inverting the sets of processed seismic data utilizing seismic inversion algorithms with fixed sets of parameters;

(d) computing a set of statistical seismic characterizations ($SCs_{seismic}$) based upon the plurality of sets of inverted reflectivities;
(e) computing a plurality of statistical difference measurements (SDMs) between the statistical well characterizations ($SCs_{well}$) and the statistical seismic characterizations ($SCs_{seismic}$);
(f) selecting an optimal seismic processing sequence based upon the computed statistical difference measurements (SDMs); and
(g) processing the seismic data using the optimal seismic processing sequence and parameters to produce a set of enhanced seismic data.

15. The method of claim 14 wherein, the fixed sets of parameters of the seismic inversion algorithms have parameters which have differing values.

16. The method of claim 14 further comprising:
(h) determining whether the statistical difference measurement (SDM) is within a predetermined criteria; and
(i) repeating steps (b)-(f), utilizing a differing seismic processing sequence in step (b), until the statistical difference measurement (SDM) is within a predetermined criteria.

17. The method of claim 16 further comprising:
(j) obtaining enhanced seismic data by processing the seismic data corresponding to the subsurface region of interest utilizing the seismic processing sequence associated with the statistical difference measurement (SDM) that is within the predetermine criteria.

18. The method of claim 17 wherein, the fixed sets of parameters of the seismic processing sequences differ at least by differing an order of processing steps within each respective seismic processing sequence.

19. The method of claim 17 wherein, the fixed sets of parameters of the seismic processing sequences differ at least by differing a number of processing steps within each respective seismic processing sequence.

20. The method of claim 17 wherein, the fixed sets of parameters of the seismic processing sequences differ at least by differing values of coefficients between the differing processing sequences.

21. A method for obtaining optimized inverted reflectivities, the method comprising:
(a) obtaining band-limited well reflectivities corresponding to a subsurface region of interest;
(b) computing a plurality of statistical well characterizations ($SCs_{well}$) based upon the band-limited well reflectivities corresponding to a subsurface region of interest;
(c) obtaining processed seismic data corresponding to the subsurface region of interest;
(d) computing a plurality of sets of inverted reflectivities be inverting the set of processed seismic data utilizing a plurality of differing seismic inversion algorithms;
(e) computing a plurality of statistical seismic characterizations ($SCs_{seismic}$) based upon the sets of inverted reflectivities;
(f) computing a plurality of statistical difference measurements (SDMs) between the statistical well characterizations ($SCs_{well}$) and the statistical seismic characterization ($SCs_{seismic}$);
(g) selecting an optimal seismic inversion algorithm based upon the computed statistical difference measurements (SDMs); and
(h) inverting the seismic data using the optimal seismic inversion algorithm to produce a set of optimized inverted reflectivities.

22. The method of claim 21 further comprising the step:
(i) calculating uncertainty values for the inverted reflectivities.

* * * * *